United States Patent
Matsueda et al.

(10) Patent No.: US 10,343,744 B2
(45) Date of Patent: Jul. 9, 2019

(54) BICYCLE OPERATING DEVICE

(71) Applicant: SHIMANO INC., Sakai (JP)

(72) Inventors: Keiji Matsueda, Sakai (JP); Kentaro Kosaka, Sakai (JP)

(73) Assignee: SHIMANO INC., Sakai (JP)

( * ) Notice: Subject to any disclaimer, the term of this patent is extended or adjusted under 35 U.S.C. 154(b) by 267 days.

(21) Appl. No.: 15/162,539

(22) Filed: May 23, 2016

(65) Prior Publication Data

US 2017/0334508 A1 Nov. 23, 2017

(51) Int. Cl.
  *B62L 3/02* (2006.01)
  *B62K 23/06* (2006.01)
  *B62M 25/04* (2006.01)

(52) U.S. Cl.
  CPC .............. *B62L 3/023* (2013.01); *B62K 23/06* (2013.01); *B62M 25/04* (2013.01)

(58) Field of Classification Search
  CPC .................................. B62L 3/02; B62L 3/023
  See application file for complete search history.

(56) References Cited

U.S. PATENT DOCUMENTS

| 9,321,501 B1* | 4/2016 | Miki | B62K 23/06 |
| 2008/0257658 A1* | 10/2008 | Lumpkin | B60T 7/102 |
| | | | 188/24.22 |
| 2012/0297919 A1* | 11/2012 | Fukao | B62K 23/06 |
| | | | 74/502.2 |
| 2013/0255239 A1* | 10/2013 | Miki | B62L 3/023 |
| | | | 60/325 |
| 2014/0174234 A1 | 6/2014 | Watarai et al. | |
| 2015/0274252 A1 | 10/2015 | Nishino | |
| 2016/0347403 A1* | 12/2016 | Watarai | B62L 3/023 |
| 2017/0217534 A1* | 8/2017 | Nishikawa | B62K 23/06 |
| 2017/0305492 A1* | 10/2017 | Komatsu | B62K 23/06 |

FOREIGN PATENT DOCUMENTS

| CN | 104943803 | 9/2015 |
| CN | 106553735 | 4/2017 |
| DE | 102013021514 | 6/2014 |
| TW | 201339045 | 10/2013 |

* cited by examiner

*Primary Examiner* — Thomas E Lazo
(74) *Attorney, Agent, or Firm* — Mori & Ward, LLP

(57) ABSTRACT

A bicycle operating device comprises a base member, an operating member, and a hydraulic unit. The operating member is pivotally coupled to the base member about a pivot axis. The hydraulic unit is provided on the base member and comprises a hydraulic cylinder, a piston, and a hydraulic reservoir. The hydraulic cylinder includes a cylinder bore being at least partly provided above the pivot axis in a mounting state where the bicycle operating device is mounted to a bicycle. The piston is movably provided in the cylinder bore. The cylinder bore and the piston define a hydraulic chamber. The hydraulic reservoir includes a reservoir chamber connected to the hydraulic chamber. The reservoir chamber is provided above the cylinder bore without overlapping with the cylinder bore in a transverse direction parallel to the pivot axis in the mounting state.

15 Claims, 19 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member, an operating member, and a hydraulic unit. The operating member is pivotally coupled to the base member about a pivot axis. The hydraulic unit is provided on the base member and comprises a hydraulic cylinder, a piston, and a hydraulic reservoir. The hydraulic cylinder includes a cylinder bore being at least partly provided above the pivot axis in a mounting state where the bicycle operating device is mounted to a bicycle. The piston is movably provided in the cylinder bore. The cylinder bore and the piston define a hydraulic chamber. The hydraulic reservoir includes a reservoir chamber connected to the hydraulic chamber. The reservoir chamber is provided above the cylinder bore without overlapping with the cylinder bore in a transverse direction parallel to the pivot axis in the mounting state.

With the bicycle operating device according to the first aspect, it is possible to efficiently arrange the hydraulic cylinder and the hydraulic reservoir in the bicycle operating device.

In accordance with a second aspect of the present invention, the bicycle operating device according to the first aspect is configured so that the base member includes a first end portion, a second end portion, and a grip portion. The second end portion is opposite to the first end portion and is configured to be mounted to a handlebar of the bicycle. The grip portion is provided between the first end portion and the second end portion. The hydraulic reservoir is provided at the first end portion.

With the bicycle operating device according to the second aspect, it is possible to utilize the first end portion of the base member as an area in which the hydraulic reservoir is provided. Accordingly, it is possible to more efficiently arrange the hydraulic cylinder and the hydraulic reservoir in the bicycle operating device.

In accordance with a third aspect of the present invention, the bicycle operating device according to any one of the above aspects is configured so that the first end portion includes a pommel portion. The hydraulic reservoir is provided at the pommel portion.

With the bicycle operating device according to the third aspect, it is possible to effectively utilize the pommel portion as an area in which the hydraulic reservoir is provided.

In accordance with a fourth aspect of the present invention, the bicycle operating device according to any one of the above aspects is configured so that the base member includes a first side surface, a second side surface, a fluid passageway. The second side surface is laterally opposite to the first side surface in the mounting state of the bicycle operating device. The fluid passageway is connected to the hydraulic chamber. The cylinder bore is disposed between the first side surface and the second side surface. The fluid passageway is disposed between the first side surface and the cylinder bore.

With the bicycle operating device according to the fourth aspect, it is possible to effectively utilize the base member as an area in which the cylinder bore and the fluid passageway are provided. Accordingly, it is possible to more efficiently arrange the cylinder bore and the fluid passageway in the bicycle operating device.

In accordance with a fifth aspect of the present invention, the bicycle operating device according to any one of the above aspects is configured so that the operating member extends downward from the base member in the mounting state of the bicycle operating device.

With the bicycle operating device according to the fifth aspect, it is possible to improve operability of the operating device with efficiently arranging the hydraulic cylinder and the reservoir chamber in the bicycle operating device.

In accordance with a sixth aspect of the present invention, the bicycle operating device according to any one of the above aspects is configured so that the piston is movable relative to the hydraulic cylinder in a movement direction. The reservoir chamber has a length defined in the movement direction. The length of the reservoir chamber is longer than a stroke of the piston.

With the bicycle operating device according to the sixth aspect, it is possible to maintain a desired size of the reservoir chamber.

In accordance with a seventh aspect of the present invention, the bicycle operating device according to any one of the above aspects further comprises a cover member attached to the base member to at least partly cover the base member. The cover member is at least partly made of an elastic material.

With the bicycle operating device according to the seventh aspect, it is possible to at least partly protect the base member with the cover member.

In accordance with an eighth aspect of the present invention, the bicycle operating device according to any one of the above aspects further comprises a shifting unit to operate a shifting device.

With the bicycle operating device according to the eighth aspect, it is possible to operate the shifting device in addition to a hydraulic bicycle component.

In accordance with a ninth aspect of the present invention, the bicycle operating device according to any one of the above aspects is configured so that the shifting unit includes a cable control member pivotally provided on the base member about a cable control axis.

With the bicycle operating device according to the ninth aspect, it is possible to operate the shifting device via the cable control member.

In accordance with a tenth aspect of the present invention, the bicycle operating device according to any one of the above aspects is configured so that the piston is movable relative to the hydraulic cylinder in a movement direction. The cylinder bore has a cylinder center axis extending in the movement direction. The cable control axis and the cylinder center axis are arranged to define a virtual plane together.

With the bicycle operating device according to the tenth aspect, it is possible to efficiently arrange the cylinder bore and the shifting unit in a direction perpendicular to the virtual plane. Accordingly, it is possible to make the bicycle operating device compact in the direction perpendicular to the virtual plane.

In accordance with an eleventh aspect of the present invention, the bicycle operating device according to any one of the above aspects further comprises an additional operating member pivotally provided on one of the operating member and the base member about an additional pivot axis. The cable control axis, the cylinder center axis, and the additional pivot axis are arranged to define the virtual plane together.

With the bicycle operating device according to the eleventh aspect, it is possible to efficiently arrange the cylinder bore, the shifting unit, and the additional operating member in the direction perpendicular to the virtual plane. Accordingly, it is possible to make the bicycle operating device more compact in the direction perpendicular to the virtual plane.

In accordance with a twelfth aspect of the present invention, the bicycle operating device according to any one of the above aspects is configured so that the additional operating member is provided on the operating member.

With the bicycle operating device according to the twelfth aspect, it is possible to more efficiently arrange the operating member and the additional operating member.

In accordance with a thirteenth aspect of the present invention, the bicycle operating device according to any one of the above aspects is configured so that the operating member includes a base portion and an operating portion. The base portion is pivotally coupled to the base member about the pivot axis. The operating portion is pivotally provided on the base portion about the additional pivot axis.

With the bicycle operating device according to the thirteenth aspect, it is possible to operate two different bicycle components by using a pivotal movement of the operating occurring about the pivot axis and another pivotal movement of the operating member occurring about the additional pivot axis.

In accordance with a fourteenth aspect of the present invention, the bicycle operating device according to any one of the above aspects is configured so that the operating member is pivotable relative to the base member about the pivot axis between a rest position and an operated position. The piston is configured to be pushed from an initial position to an actuated position in response to a movement of the operating member from the rest position toward the operated position to supply a hydraulic pressure toward at least one bicycle component.

With the bicycle operating device according to the fourteenth aspect, it is possible to operate the at least one bicycle component by using the operating member and the hydraulic pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
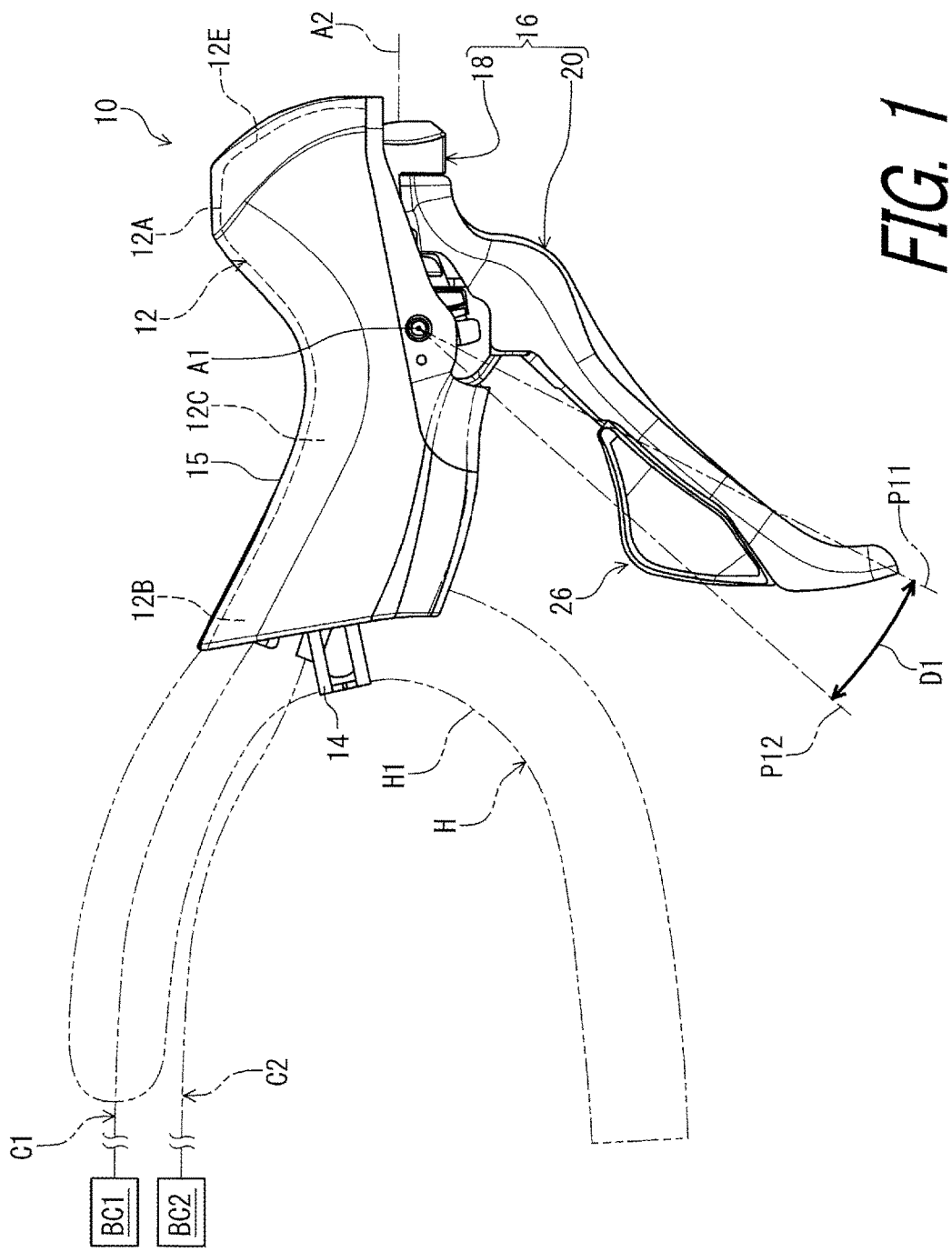
FIG. 1 is a right side elevational view of a bicycle operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a handlebar H of a bicycle. In this embodiment, the bicycle operating device 10 is configured to be mounted to a drop-down handlebar. However, structures of the bicycle operating device 10 can be applied to other type of handlebars such as a flat handlebar, a time trial handlebar, and a bull horn handlebar. The handlebar H can also be referred to as the drop-down handlebar H. Furthermore, the bicycle operating device 10 can be mounted to parts other than the handlebar H in the bicycle. Since structures of the bicycle have been known in the bicycle field, they will not be described in detail here for the sake of brevity.

The bicycle operating device 10 is operatively coupled to a hydraulic bicycle component BC1 such as a hydraulic bicycle brake. In this embodiment, the bicycle operating device 10 is operatively coupled to the hydraulic bicycle component BC1 via a hydraulic hose C1.

Furthermore, the bicycle operating device 10 is operatively coupled to an additional bicycle component BC2. In this embodiment, the bicycle operating device 10 is operatively coupled to the additional bicycle component BC2 via a mechanical control cable C2. Examples of the additional bicycle component BC2 include a shifting device, an adjustable seatpost assembly, and a bicycle suspension. Examples of the mechanical control cable C2 include a Bowden cable. In this embodiment, the additional bicycle component BC2 includes the shifting device to change a speed stage of a bicycle. The additional bicycle component BC2 can also be referred to as the shifting device BC2.

In this embodiment, the bicycle operating device 10 is a right hand side control device configured to be operated by the rider's right hand to actuate the hydraulic bicycle component BC1 and the additional bicycle component BC2. However, the structures of the bicycle operating device 10 can be applied to a left hand side control device.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of the bicycle with facing the handlebar H. Accordingly, these terms, as utilized to describe the bicycle operating device 10, should be interpreted relative to the bicycle equipped with the bicycle operating device 10 as used in an upright riding position on a horizontal surface.

As seen in FIG. 1, the bicycle operating device 10 comprises a base member 12. The base member 12 is configured to be mounted to the handlebar H of the bicycle. However, the base member 12 can be mounted to parts other than the handlebar H in the bicycle. The base member 12 includes a first end portion 12A, a second end portion 12B, and a grip portion 12C. The second end portion 12B is opposite to the first end portion 12A and is configured to be mounted to the handlebar H. The grip portion 12C is provided between the first end portion 12A and the second end portion 12B.

The drop-down handlebar H includes a curved part H1. The second end portion 12B is configured to be coupled to the curved part H1 in a mounting state where the bicycle operating device 10 is mounted to the handlebar H. The bicycle operating device 10 comprises a mounting clamp 14 to couple the base member 12 to the handlebar H.

Figure 2:
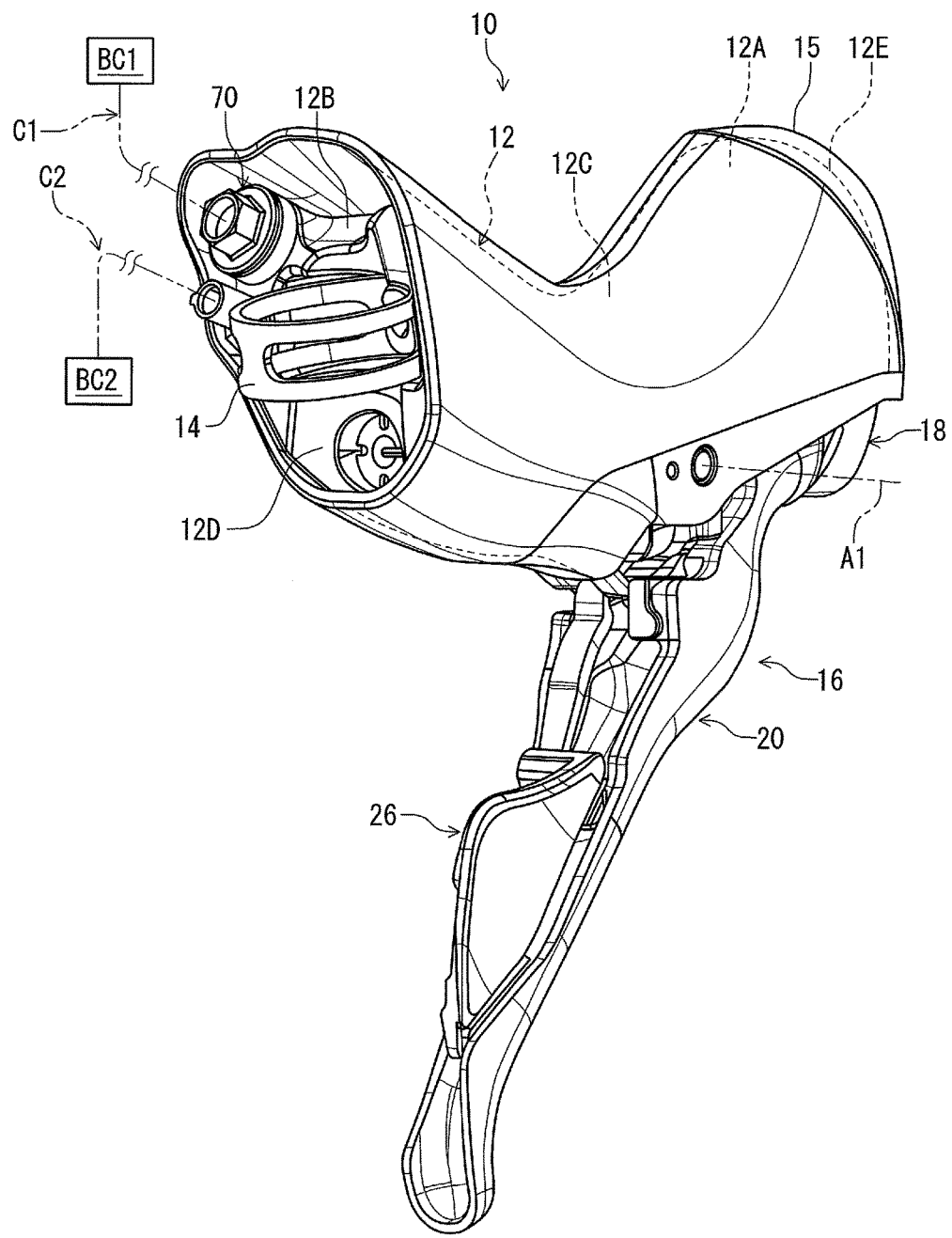
FIG. 2 is a perspective view of the bicycle operating device illustrated in FIG. 1.

As seen in FIG. 2, the second end portion 12B includes a mounting surface 12D having a curved shape corresponding to the drop-down handlebar H. Specifically, the mounting surface 12D has the curved shape corresponding to an outer peripheral surface of the curved part H1.

As seen in FIGS. 1 and 2, the first end portion 12A includes a pommel portion 12E. The pommel portion 12E extends obliquely upward from the grip portion 12C. The pommel portion 12E is disposed above the second end portion 12B in the mounting state of the bicycle operating device 10. The pommel portion 12E can also be configured to be graspable if needed and/or desired.

In this embodiment, the bicycle operating device 10 further comprises a cover member 15 attached to the base member 12 to at least partly cover the base member 12. The cover member 15 is at least partly made of elastic material such as rubber.

As seen in FIG. 1, the bicycle operating device 10 comprises an operating member 16 pivotally coupled to the base member 12 about a pivot axis A1. The operating member 16 extends downward from the base member 12 in the mounting state of the bicycle operating device 10. In this embodiment, the operating member 16 is pivotable relative to the base member 12 about the pivot axis A1 in a first operating direction D1. The operating member 16 is configured to be pivotable relative to the base member 12 between a rest position P11 (hereinafter the first rest position P11) and an operated position P12 (hereinafter the first operated position P12). The first operating direction D1 is a circumferential direction defined about the pivot axis A1. In this embodiment, the operating member 16 is provided as a brake operating lever pivotable about the pivot axis A1.

In the present application, the term "rest position" as used herein refers to a position at which a movable part such as the operating member 16 remains stationary in a state where the movable part is not operated by the user. The term "operated position" as used herein refers to a position at which the movable part has been operated by the user to perform the operation of the bicycle component.

Figure 3:
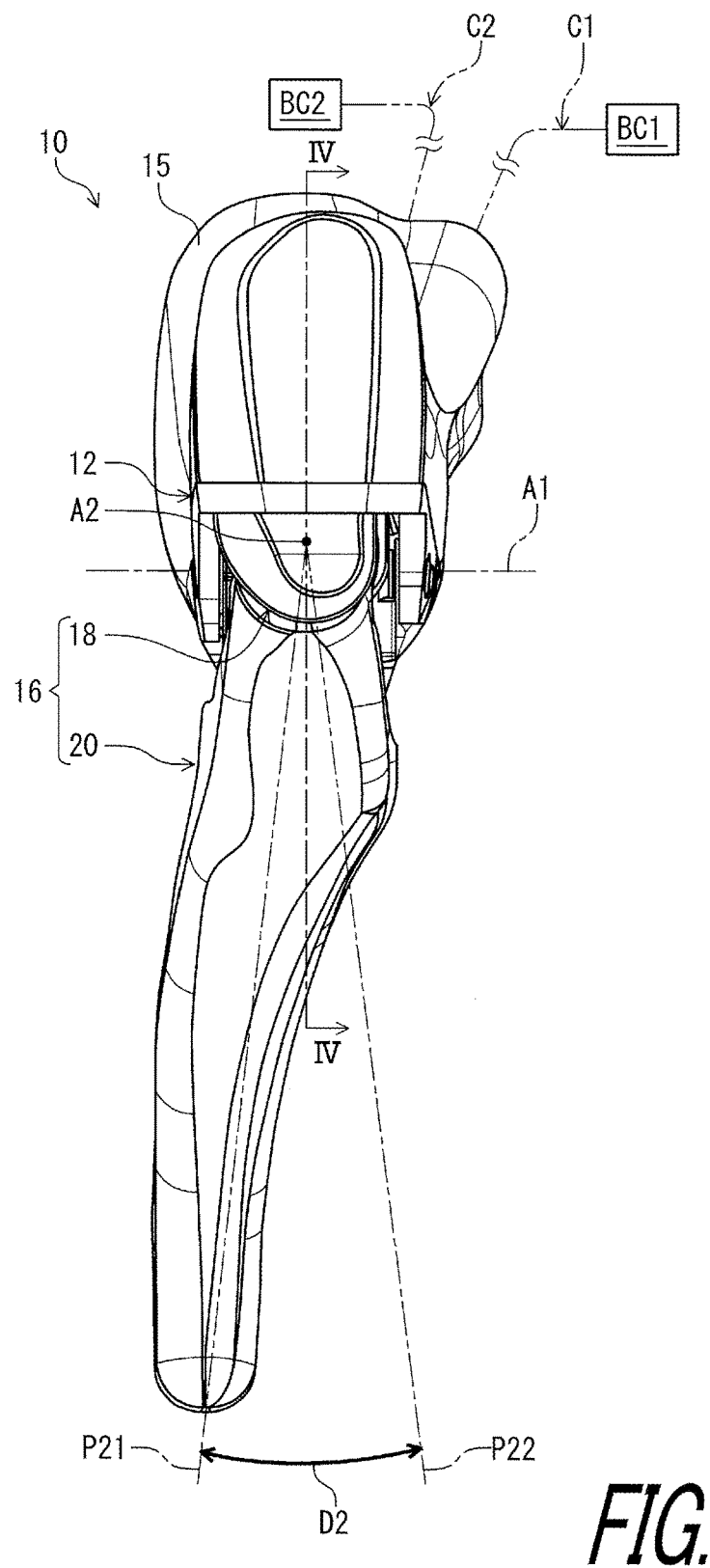
FIG. 3 is a front view of the bicycle operating device illustrated in FIG. 1.

As seen in FIG. 3, the operating member 16 is pivotable relative to the base member 12 about the additional pivot axis A2 in a second operating direction D2. The operating member 16 is pivotable relative to the base member 12 between a second rest position P21 and a second operated position P22. The second operating direction D2 is a circumferential direction defined about the additional pivot axis A2. In this embodiment, the operating member 16 is provided as a shift lever pivotable about the additional pivot axis A2. However, the function of the shift lever can be omitted from the operating member 16.

As seen in FIGS. 1 and 3, the operating member 16 includes a base portion 18 and an operating portion 20. The base portion 18 is pivotally coupled to the base member 12 about the pivot axis A1. The operating portion 20 is pivotally provided on the base portion 18 about the additional pivot axis A2.

Figure 4:
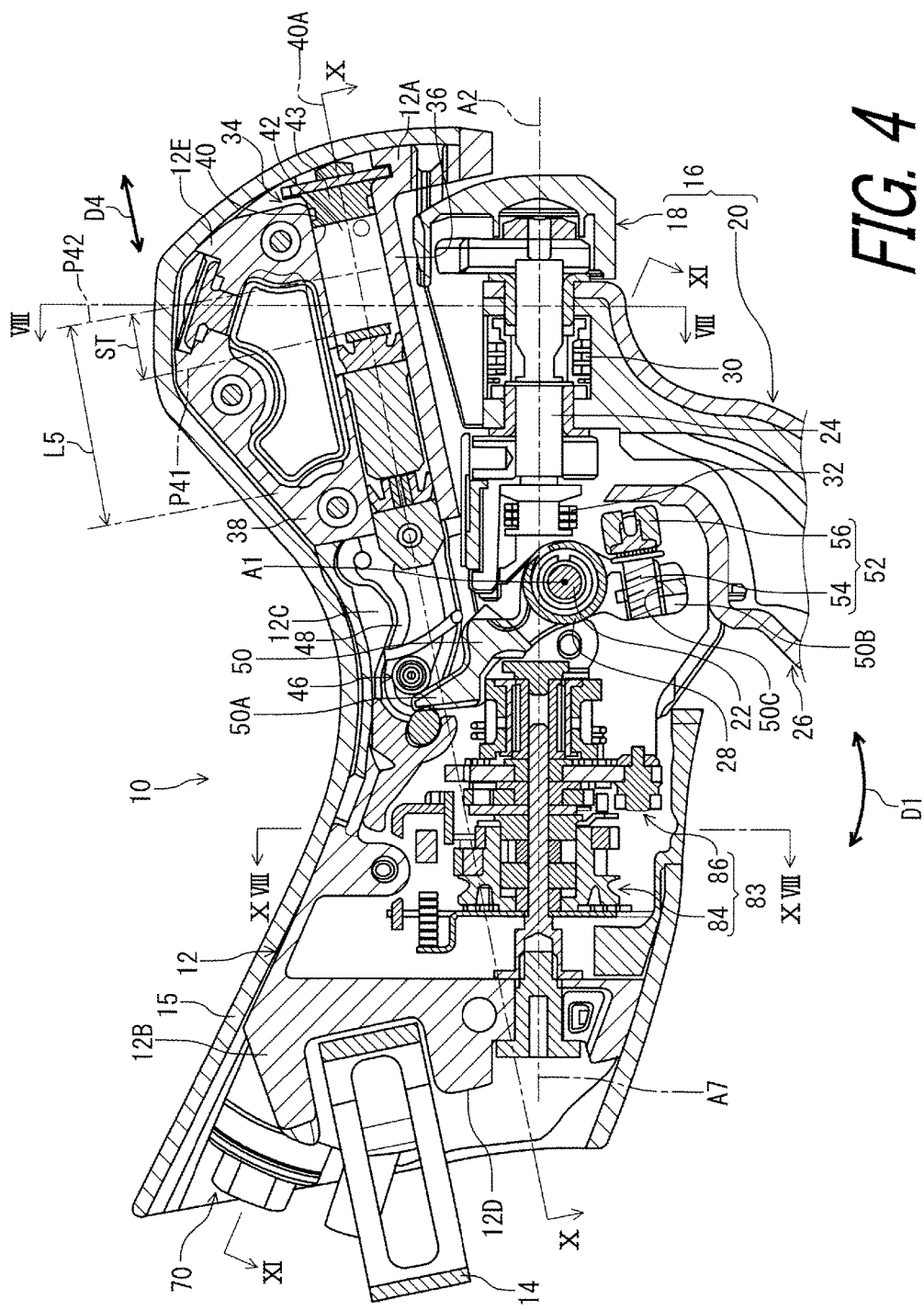
FIG. 4 is a partial cross-sectional view of the bicycle operating device taken along line IV-IV of FIG. 3.

As seen in FIG. 4, the bicycle operating device 10 comprises a pivot pin 22 and an additional pivot pin 24. The pivot pin 22 defines the pivot axis A1. The additional pivot pin 24 defines the additional pivot axis A2. The base portion 18 is pivotally coupled to the base member 12 via the pivot pin 22. The operating portion 20 is pivotally coupled to the base portion 18 about via the additional pivot pin 24.

Figure 5:
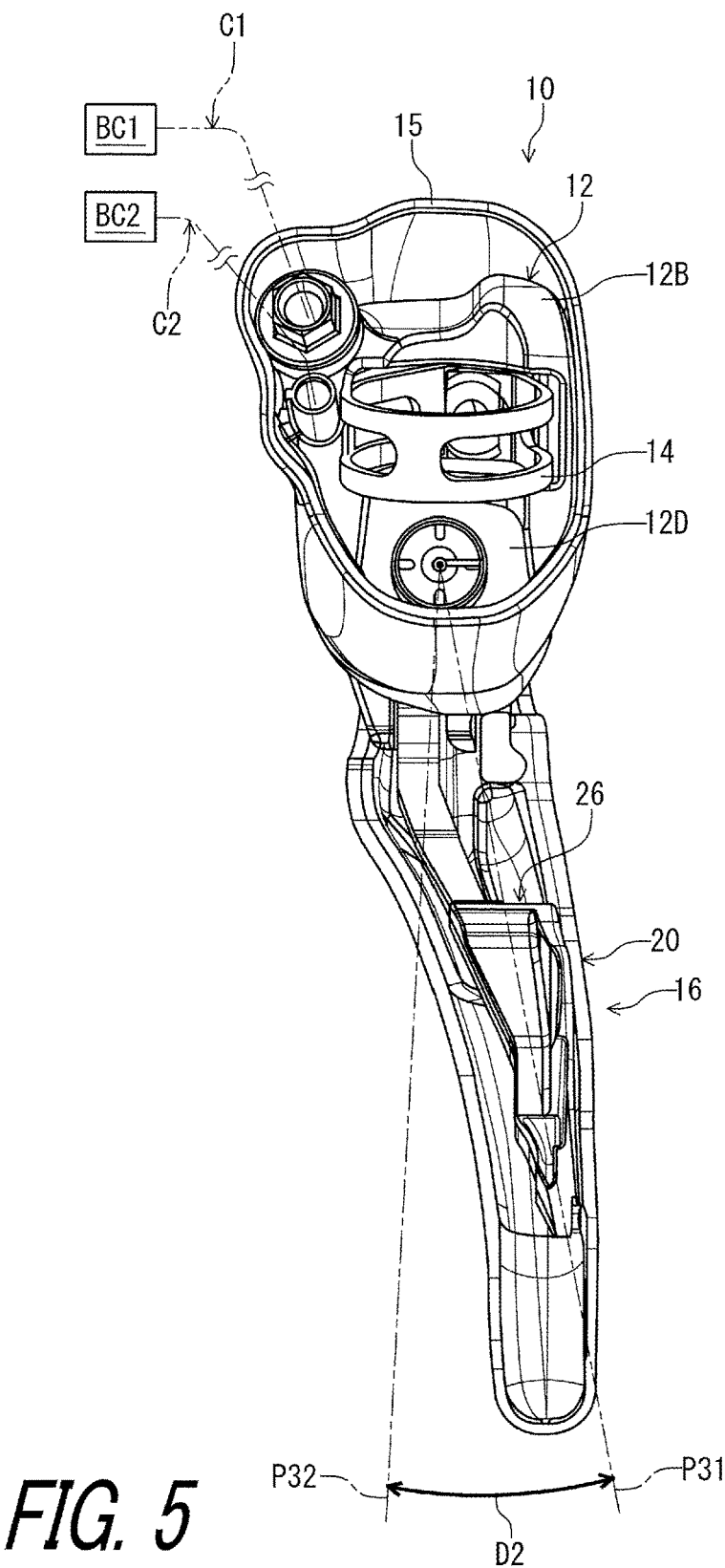
FIG. 5 is a rear view of the bicycle operating device illustrated in FIG. 1.

As seen in FIGS. 1 and 5, the bicycle operating device 10 further comprises an additional operating member 26. The additional operating member 26 is pivotally provided on one of the operating member 16 and the base member 12 about the additional pivot axis A2. In this embodiment, the additional operating member 26 is provided on the operating member 16. Specifically, the additional operating member 26 is pivotable relative to the base member 12 about the additional pivot axis A2 in the second operating direction D2. The additional operating member 26 is pivotable relative to the base member 12 between a third rest position P31 and a third operated position P32. The additional operating member 26 is pivotally coupled to the base portion 18 via the additional pivot pin 24. The additional operating member 26 is pivotable relative to the base portion 18 about the additional pivot axis A2. In this embodiment, the additional operating member 26 is provided as an additional shift lever pivotable about the additional pivot axis A2. The additional operating member 26 can be omitted from the bicycle operating device 10.

As seen in FIG. 4, the bicycle operating device 10 comprises a first biasing member 28 to bias the operating member 16 toward the first rest position P11 (FIG. 1) relative to the base member 12. The first biasing member 28 is mounted on the pivot pin 22. The base portion 18 is in contact with the base member 12 in a rest state where the operating member 16 is at the first rest position P11. For example, the first biasing member 28 includes a torsion spring.

The bicycle operating device 10 comprises a second biasing member 30 to bias the operating member 16 toward the second rest position P21 (FIG. 3) relative to the base member 12. In this embodiment, the second biasing member 30 biases the operating portion 20 toward the second rest position P21 (FIG. 3) relative to the base portion 18. The second biasing member 30 is mounted on the additional pivot pin 24. The operating portion 20 is in contact with the base portion 18 in a state where the operating portion 20 is at the second rest position. For example, the second biasing member 30 includes a torsion spring.

The bicycle operating device 10 comprises a third biasing member 32 to bias the additional operating member 26 toward the third rest position P31 (FIG. 5) relative to the base member 12. In this embodiment, the third biasing member 32 biases the additional operating member 26 toward the third rest position P31 (FIG. 5) relative to the operating member 16 (the base portion 18). The third biasing member 32 is mounted on the additional pivot pin 24. As seen in FIG. 5, the additional operating member 26 is in contact with the operating member 16 (the operating portion 20) in a state where the operating member 16 and the additional operating member 26 are at the second rest position P21 and the third rest position P31. For example, the third biasing member 32 includes a torsion spring.

As seen in FIG. 4, the bicycle operating device 10 comprises a hydraulic unit 34 provided on the base member 12. The hydraulic unit 34 comprises a hydraulic cylinder 36 and a piston 38. Namely, the bicycle operating device 10 comprises the base member 12, the hydraulic cylinder 36, and the piston 38. The hydraulic cylinder 36 is provided on the base member 12 and includes a cylinder bore 40. The piston 38 is movably provided in the cylinder bore 40. The cylinder bore 40 and the piston 38 define a hydraulic chamber 42. In this embodiment, the hydraulic unit 34 includes a closing member 43 attached to the hydraulic cylinder 36 to close an end of the cylinder bore 40. The cylinder bore 40, the piston 38, and the closing member 43 define the hydraulic chamber 42.

The piston 38 is movable relative to the hydraulic cylinder 36 in a movement direction D4, in response to the movement of the operating member 16 in the first operating direction D1. Specifically, the piston 38 is movable relative to the hydraulic cylinder 36 between an initial position P41 and an actuated position P42. The initial position P41 corresponds to the first rest position P11 (FIG. 1) of the operating member 16. The actuated position P42 corresponds to the first operated position P12 (FIG. 2) of the operating member 16. Specifically, the piston 38 is at the initial position P41 in the rest state where the operating member 16 is at the first rest position P11 (FIG. 1). The piston 38 is at the actuated position P42 in an operated state where the operating member 16 is at the first operated position P12 (FIG. 1). The piston 38 is configured to be pushed from the initial position P41 to the actuated position P42 in response to the movement of the operating member 16 from the first rest position P11 toward the operated position P12 to supply a hydraulic pressure toward at least one bicycle component BC1.

As seen in FIG. 4, the piston 38 is movable relative to the hydraulic cylinder 36 by a stroke ST defined from the initial position P41 to the actuated position P42. The stroke ST of the piston 38 is defined in the movement direction D4. The hydraulic chamber 42 has a variable internal volume which is variable in response to the movement of the piston 38. In this embodiment, the stroke ST of the piston 38 is adjustable between a maximum stroke and a minimum stroke as described later. In such the embodiment, the stroke ST of the piston 38 can be defined as the minimum stroke.

Figure 6:
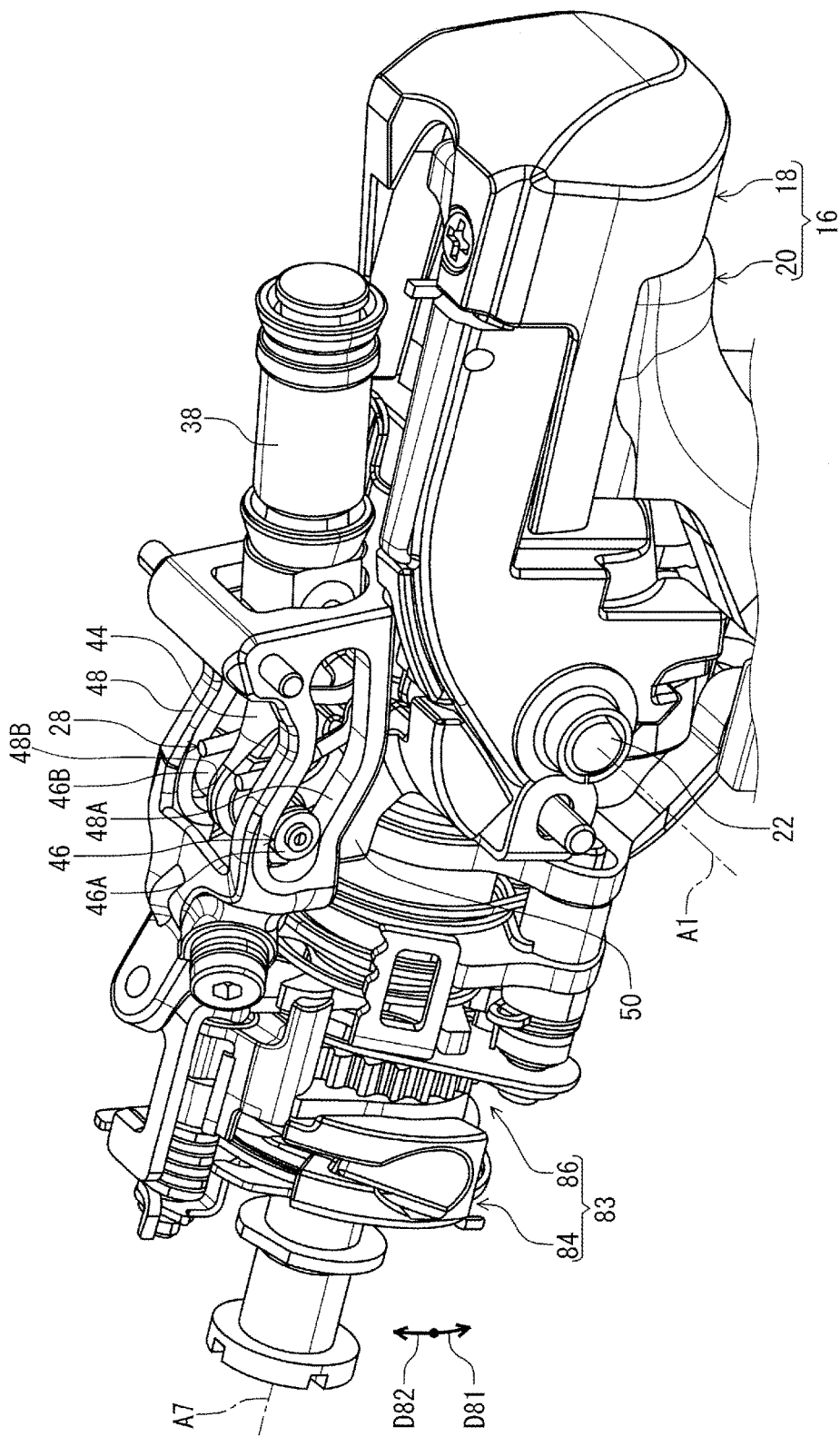
FIG. 6 is a perspective view of an internal structure of the bicycle operating device illustrated in FIG. 1.
Figure 7:
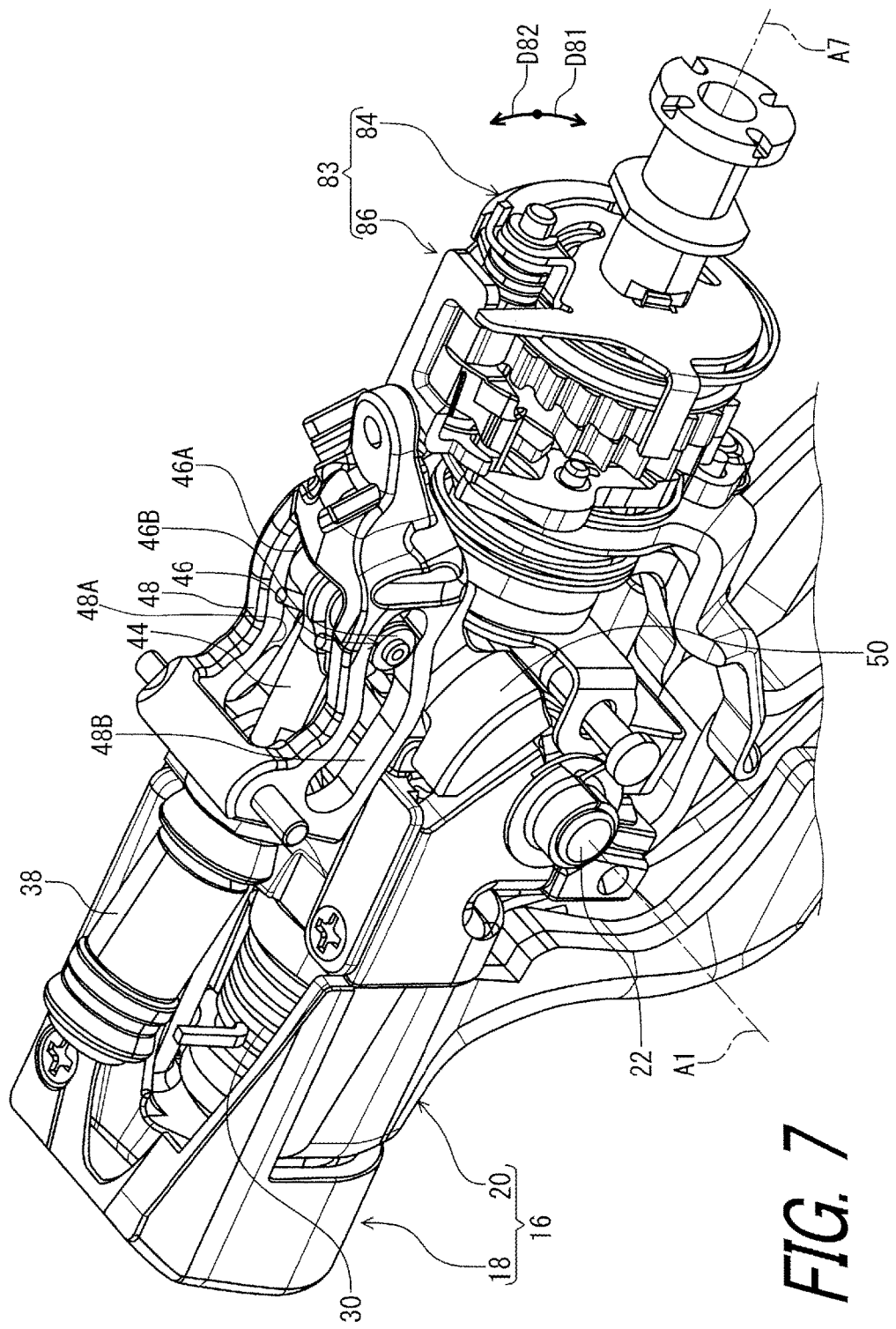
FIG. 7 is another perspective view of the internal structure of the bicycle operating device illustrated in FIG. 1.

As seen in FIGS. 4, 6, and 7, the bicycle operating device 10 comprises a piston rod 44, a guide pin 46, a guide member 48, and a transmitting member 50. The piston rod 44 is operatively coupled to the piston 38. The guide pin 46 is attached to the piston rod 44. The guide member 48 is made of a metallic material such as a titanium alloy, a stainless steel and an aluminum alloy. The guide member 48 is detachably attached to the base member 12. The guide member 48 includes a pair of guide grooves 48A and 48B. Both ends 46A and 46B of the guide pin 46 are movably provided in the guide grooves 48A and 48B. The first biasing member 28 biases the guide pin 46. The piston 38, the piston rod 44, the guide pin 46 and the guide member 48 is detachable as a unit from the base member 12. The transmitting member 50 is pivotable relative to the base member 12 about the pivot axis A1 to transmit the movement of the operating member 16 to the guide pin 46.

As seen in FIG. 4, the transmitting member 50 includes a first transmitting end 50A and a second transmitting end 50B. The first transmitting end 50A is in contact with the guide pin 46. The second transmitting end 50B is disposed opposite the first transmitting end 50A relative to the pivot axis A1.

As seen in FIG. 4, the bicycle operating device 10 comprises an adjustment member 52. The adjustment member 52 is rotatably attached to the second transmitting end 50B. The adjustment member 52 includes an adjustment screw 54 and an adjustment contact part 56. The transmitting member 50 includes a threaded hole 50C disposed at the second transmitting end 50B. The adjustment screw 54 is threadedly engaged with the threaded hole 50C. The adjustment contact part 56 is rotatably coupled to an end of the adjustment screw 54. The adjustment contact part 56 is coupled to the base portion 18 to be restricted from rotating relative to the base portion 18. An adjustment biasing element (not shown) is provided between the transmitting member 50 and the base portion 18 to bias the transmitting member 50 and the base portion 18 to push the base portion 18 against the adjustment contact part 56. Rotation of the adjustment screw 54 relative to the transmitting member 50 changes a distance between the second transmitting end 50B and the base portion 18, changing the first rest position P11 of the operating member 16 relative to the base member 12.

Figure 8:
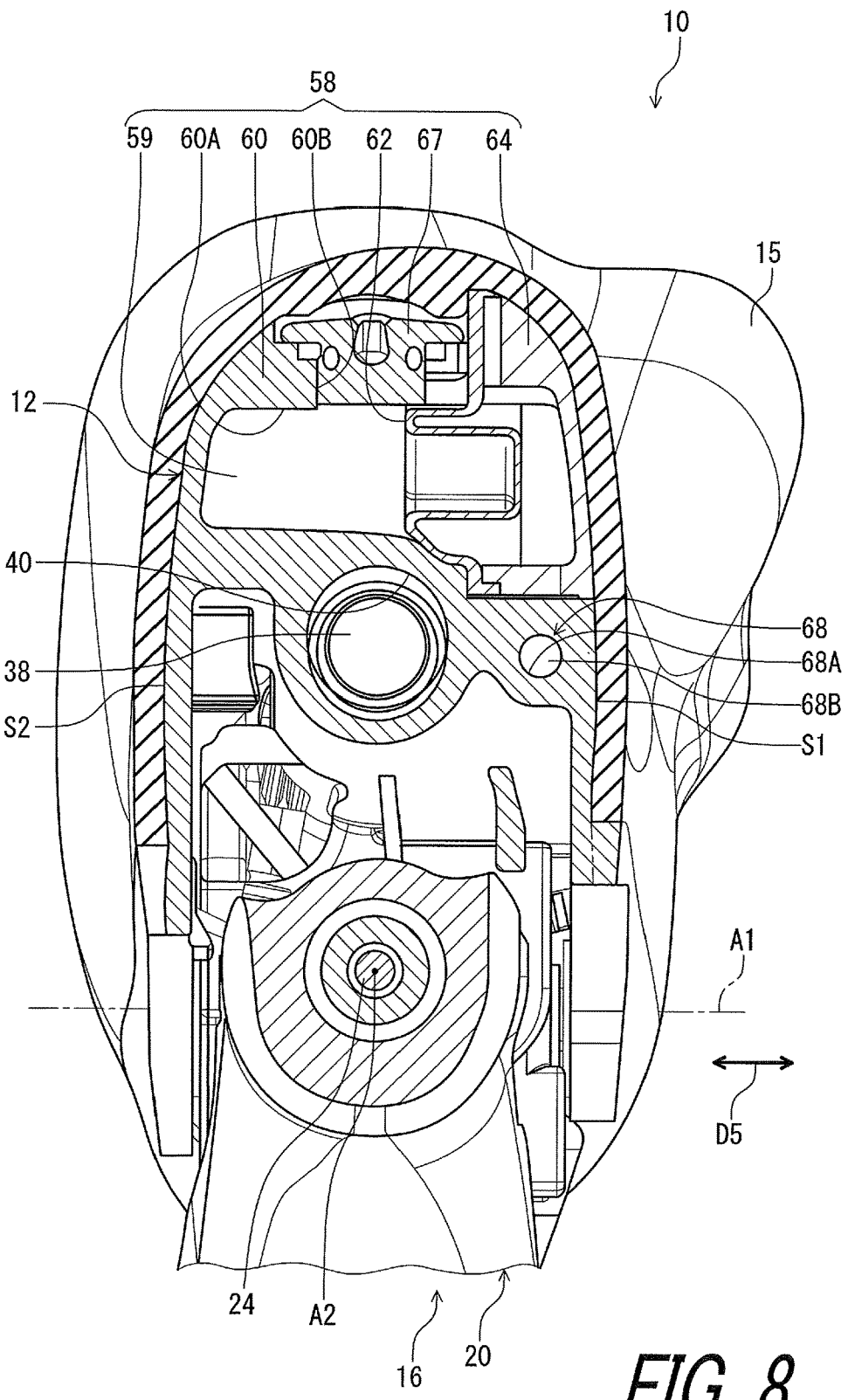
FIG. 8 is a cross-sectional view of the bicycle operating device taken along line VIII-VIII of FIG. 4.
Figure 9:
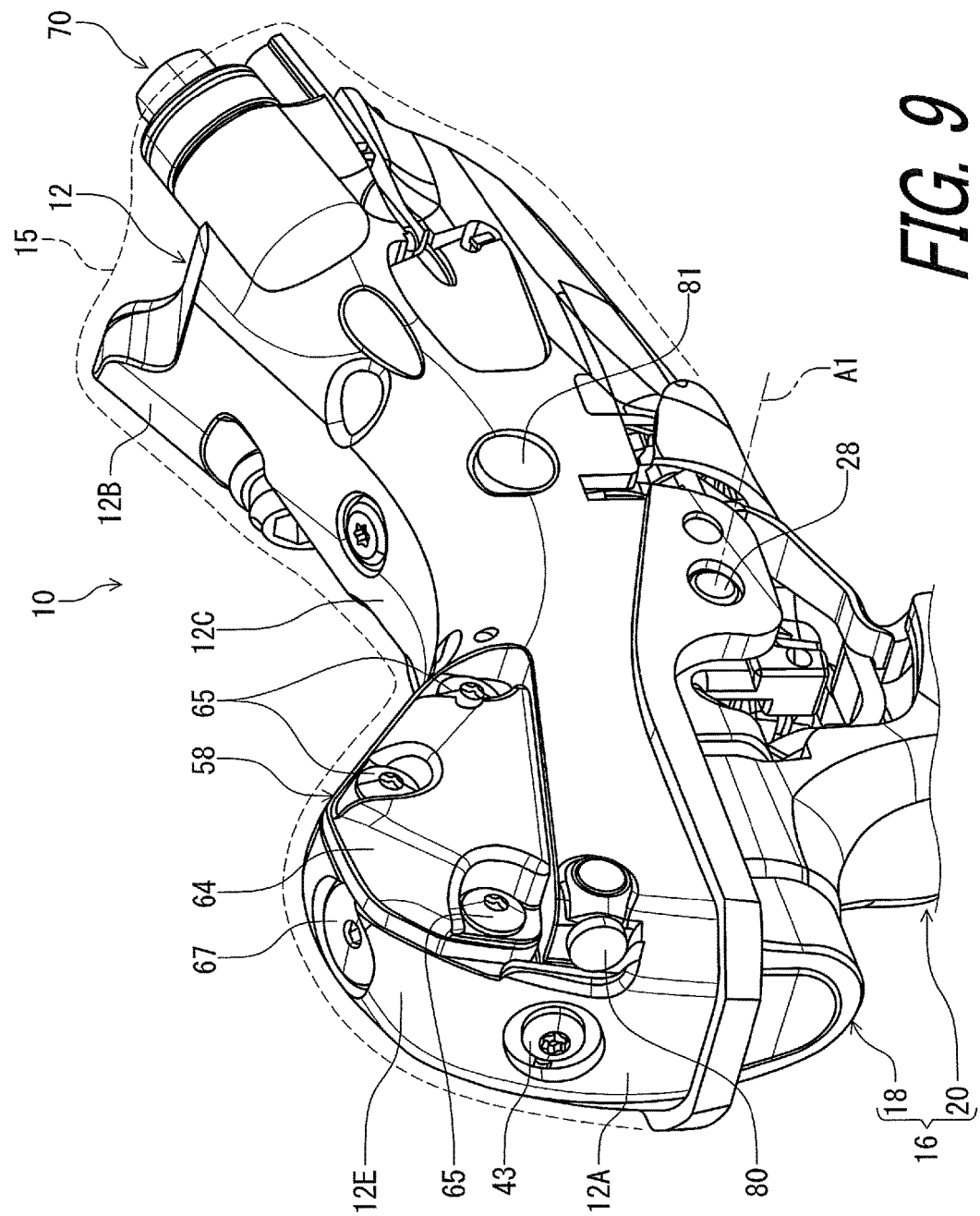
FIG. 9 is a perspective view of the bicycle operating device illustrated in FIG. 1 with a cover member omitted.

As seen in FIG. 8, the hydraulic unit 34 comprises a hydraulic reservoir 58. The hydraulic reservoir 58 includes a reservoir chamber 59 connected to the hydraulic chamber 42. As seen in FIG. 4, the hydraulic reservoir 58 is provided at the first end portion 12A. In this embodiment, as seen in FIGS. 8 and 9, the hydraulic reservoir 58 is provided at the pommel portion 12E.

As seen in FIG. 8, the hydraulic reservoir 58 includes a reservoir tank 60, a diaphragm 62, and a lid 64. The reservoir tank 60 includes a recess 60A. In this embodiment, the reservoir tank 60 is integrally provided with the hydraulic cylinder 36 as a one-piece unitary member. However, the reservoir tank 60 can be a separate member from the hydraulic cylinder 36. The diaphragm 62 is at least partly disposed in the recess 60A. The reservoir tank 60 and the diaphragm 62 define the reservoir chamber 59 in the recess 60A. In this embodiment, the hydraulic reservoir 58 includes a bleed member 67. The bleed member 67 is detachably attached to the reservoir tank 60 to close a hole 60B of the reservoir tank 60. The reservoir tank 60, the diaphragm 62, and the bleed member 67 define the reservoir chamber 59 in the recess 60A. The reservoir chamber 59 is connected to the hydraulic chamber 42 via at least one connection holes (not shown). As seen in FIGS. 8 and 9, the lid 64 is detachably attached to the base member 12 with fasteners 65 to cover the recess 60A. The hydraulic reservoir 58 can be omitted from the bicycle operating device 10.

As seen in FIGS. 4 and 8, the cylinder bore 40 is at least partly provided above the pivot axis A1 in the mounting state where the bicycle operating device 10 is mounted to the handlebar H (FIG. 1). The reservoir chamber 59 is provided above the cylinder bore 40 without overlapping with the cylinder bore 40 in a transverse direction D5 parallel to the pivot axis A1 in the mounting state.

Figure 10:
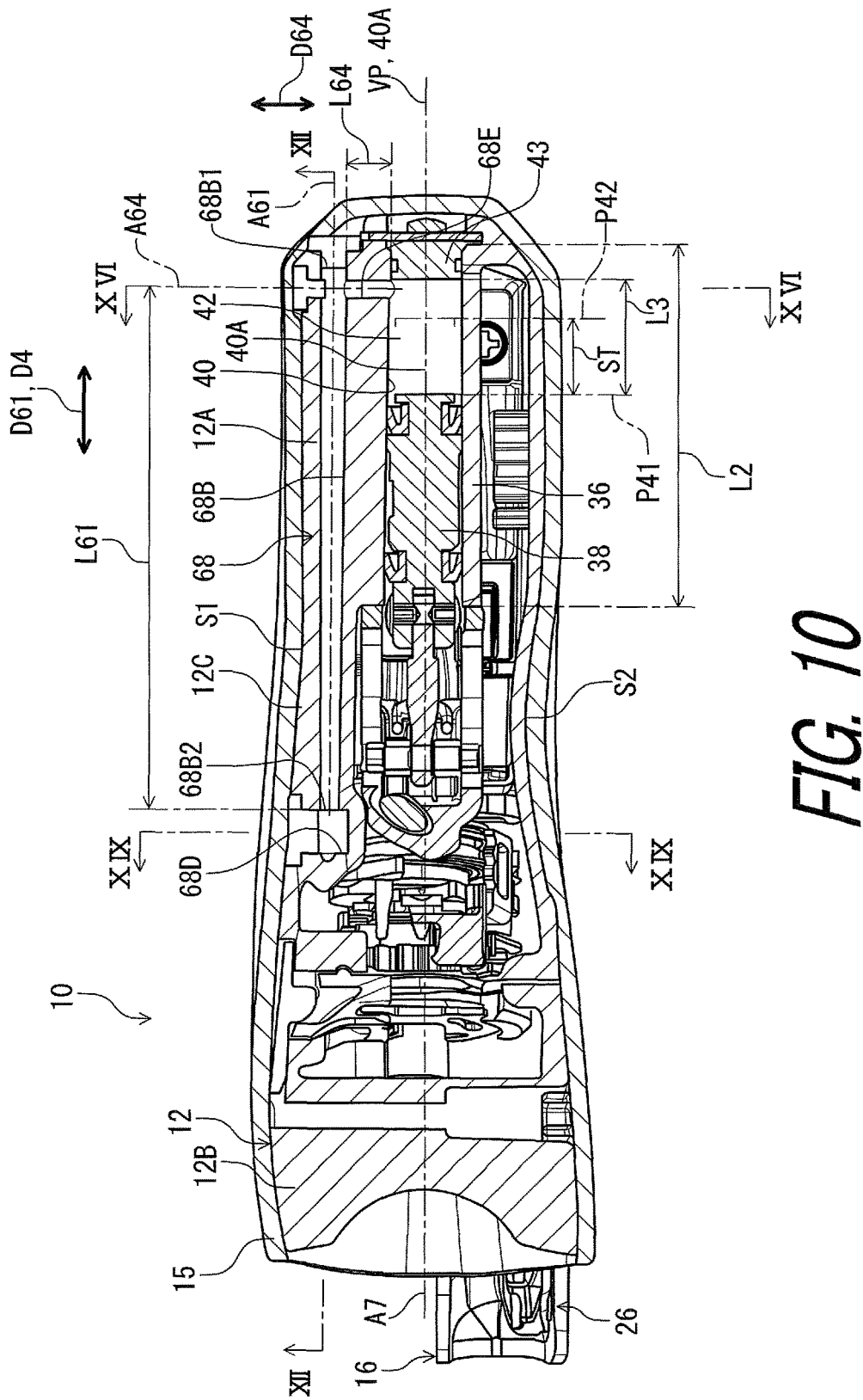
FIG. 10 is a cross-sectional view of the bicycle operating device taken along line X-X of FIG. 4.
Figure 11:
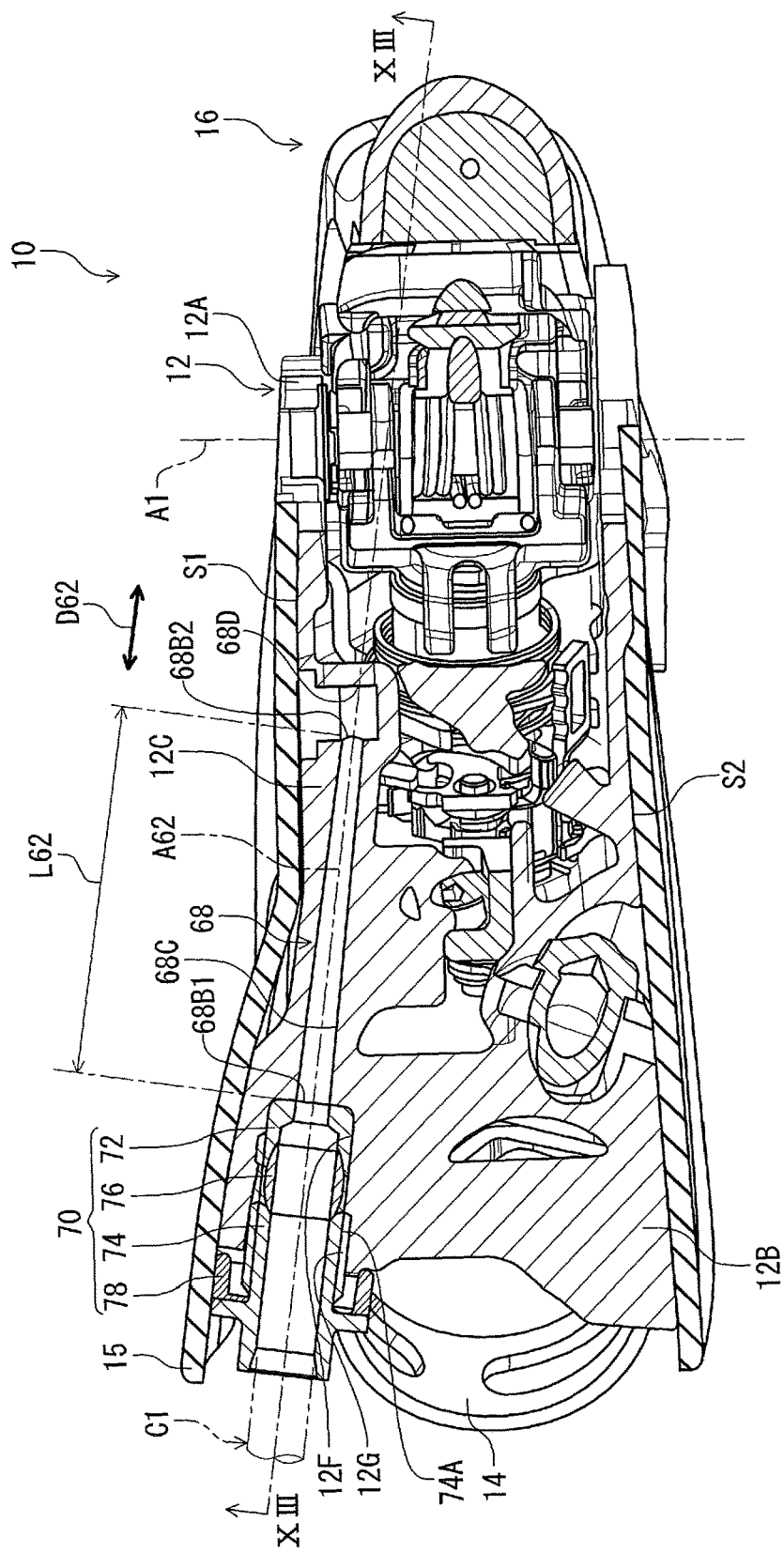
FIG. 11 is a cross-sectional view of the bicycle operating device taken along line XI-XI of FIG. 4.

As seen in FIG. 10, the base member 12 includes a fluid passageway 68. The fluid passageway 68 is connected to the hydraulic chamber 42. The fluid passageway 68 is provided inside the base member 12. As seen in FIG. 11, the base member 12 includes an outlet port 70. The outlet port 70 is connected to the fluid passageway 68 and is provided at the second end portion 12B. The fluid passageway 68 is defined from the hydraulic chamber 42 to the outlet port 70. The hydraulic hose C1 is connected to the hydraulic chamber 42 via the outlet port 70. An end of the hydraulic hose C1 is connected to the outlet port 70. As seen in FIG. 8, the base member 12 includes an inner peripheral surface 68A provided in the base member 12 and defining the fluid passageway 68.

As seen in FIG. 11, the outlet port 70 includes a receiving member 72, a connecting member 74, a first seal member 76, and a second seal member 78. The receiving member 72 and the first seal member 76 are provided in an attachment hole 12F of the base member 12. The first seal member 76 is disposed between the receiving member 72 and the connecting member 74. The second seal member 78 is disposed between the base member 12 and the connecting member 74. The connecting member 74 includes an external threaded part 74A. The attachment hole 12F includes an internal threaded part 12G threadedly engaged with the external threaded part 74A. The first and second seal members 76 and 78 are made of an elastic material such as rubber. The first seal member 76 comes into contact with an outer peripheral surface of the hydraulic hose C1 when the connecting member 74 is tightened.

As seen in FIG. 10, the fluid passageway 68 has a length longer than the stroke ST of the piston 38. The cylinder bore 40 has a cylinder axial length L2 defined in the movement direction D4. The length of the fluid passageway 68 is longer than the cylinder axial length L2. The hydraulic chamber 42 has a chamber axial length L3 defined in the movement direction D4. The length of the fluid passageway 68 is longer than the chamber axial length L3. In this embodiment, the hydraulic chamber 42 has a variable axial length in response to the movement of the piston 38 for the operation and the adjustment. The chamber axial length L3 of the hydraulic chamber 42 is defined in the rest state where the operating member 16 is at the first rest position P11 and the piston 38 is at the initial position P41 (FIG. 10). As seen in FIG. 4, the reservoir chamber 59 has a length L5 defined in the movement direction D4. The length L5 of the reservoir chamber 59 is longer than the stroke ST of the piston 38. The length of the fluid passageway 68 is longer than the length L5 of the reservoir chamber 59.

As seen in FIGS. 10 to 13, the fluid passageway 68 includes a first part 68B and a second part 68C. The second part 68C is farther from the cylinder bore 40 than the first part 68B in the fluid passageway 68. The first part 68B extends in a first direction D61. The second part 68C extends in a second direction D62 different from the first direction D61. At least one of the first part 68B and the second part 68C linearly extends. In this embodiment, each of the first part 68B and the second part 68C linearly extends. However, at least one of the first part 68B and the second part 68C can have other shapes such as a curved shape.

Figure 12:
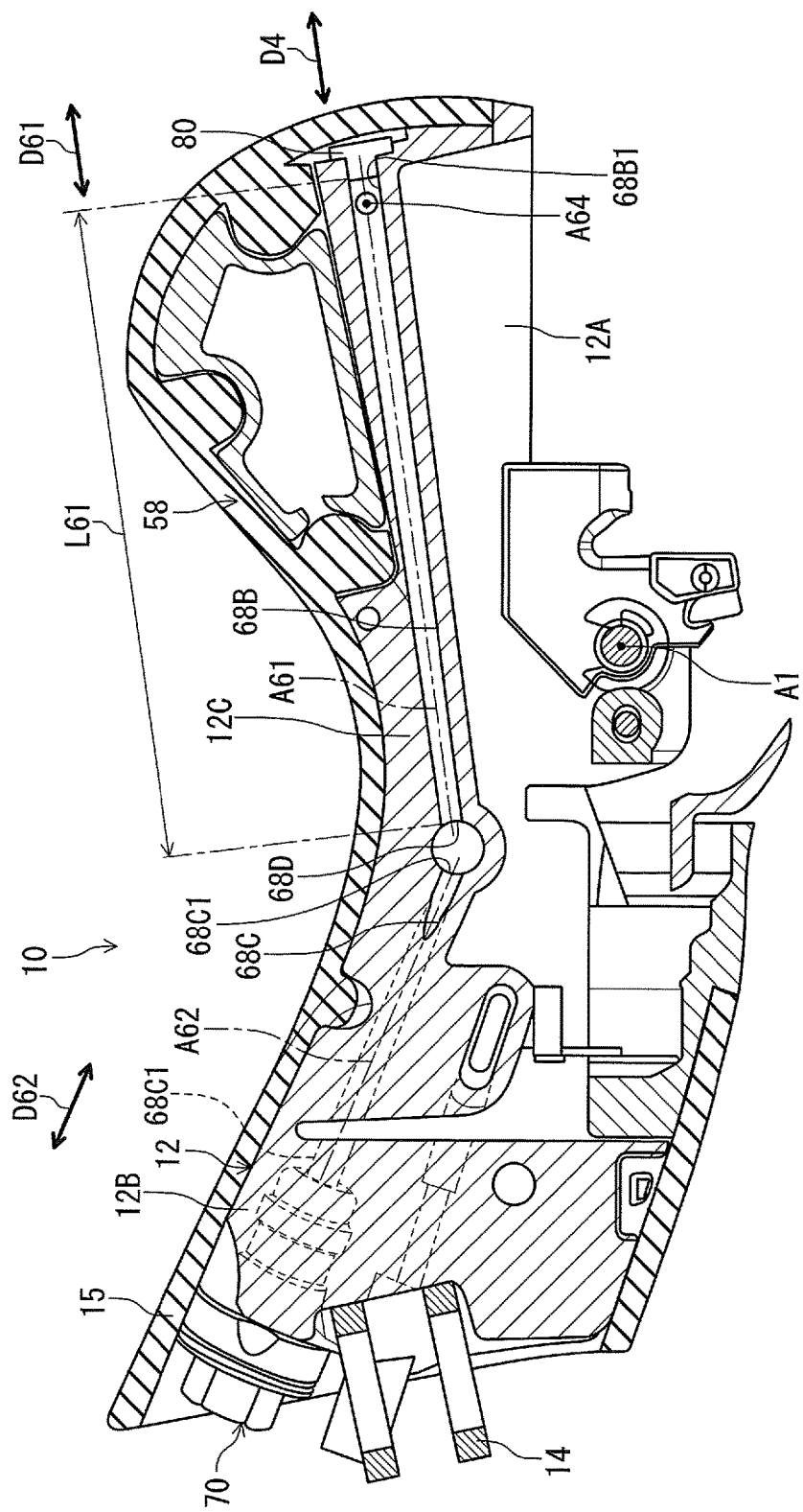
FIG. 12 is a cross-sectional view of the bicycle operating device taken along line XII-XII of FIG. 10.

As seen in FIGS. 10 and 12, the first part 68B has a first center axis A61 extending in the first direction D61. The first part 68B has a first length L61 defined along the first center axis A61. An end of the first part 68B is closed with a plug 80. The plug 80 defines the first length L61. For example, the plug 80 is made of a resin material and is non-detachably joined to the base member 12 by melting their edges and pressing them together when they are hot. Thus, the plug 80 is not detachable from the base member 12 without damage in a usage state of the bicycle operating device 10.

Figure 13:
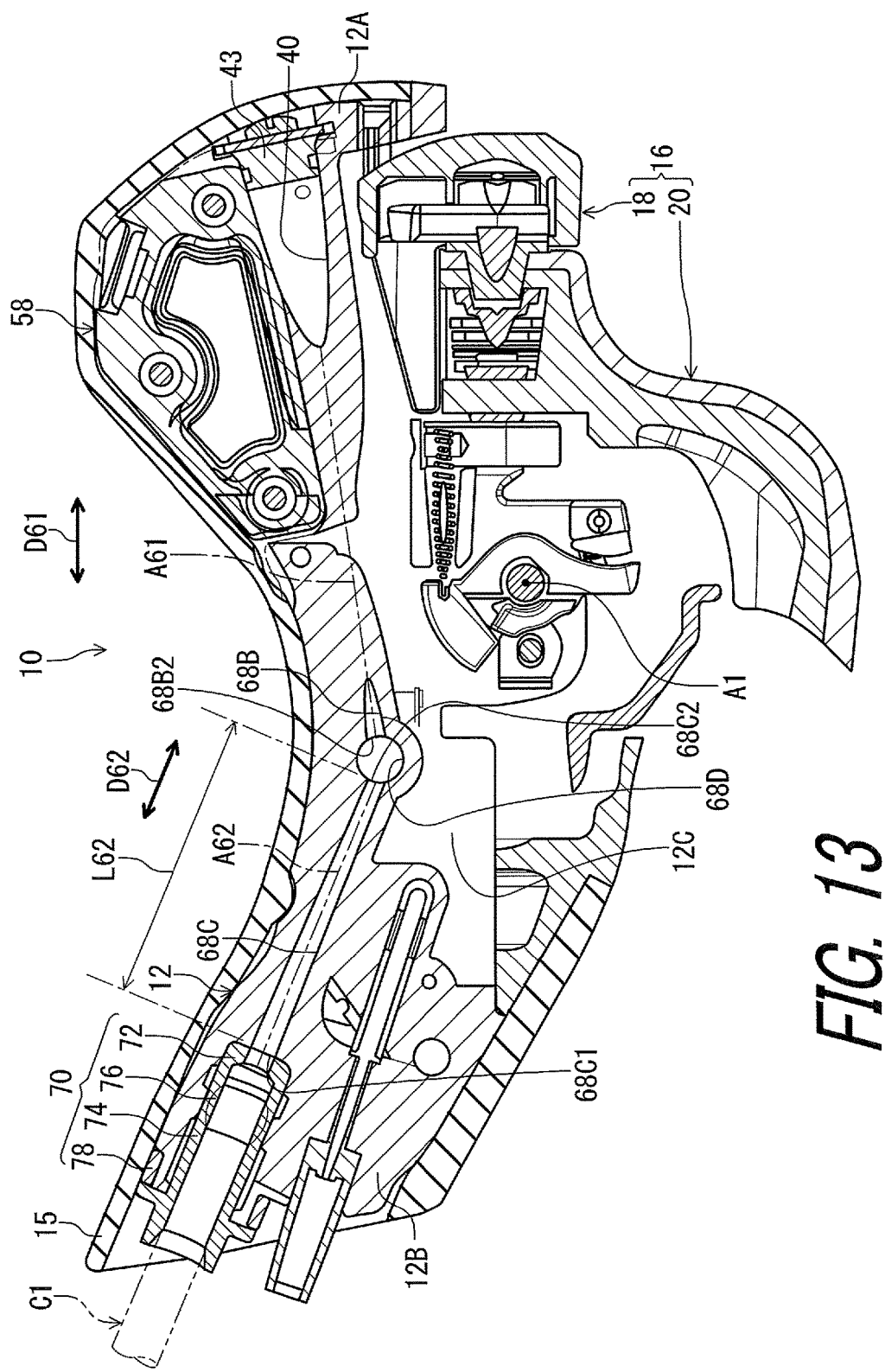
FIG. 13 is a cross-sectional view of the bicycle operating device taken along line XIII-XIII of FIG. 11.

As seen in FIGS. 11 and 13, the second part 68C has a second center axis A62 extending in the second direction D62. The second part 68C has a second length L62 defined along the second center axis A62. The second part 68C is connected to the outlet port 70.

Figure 14:
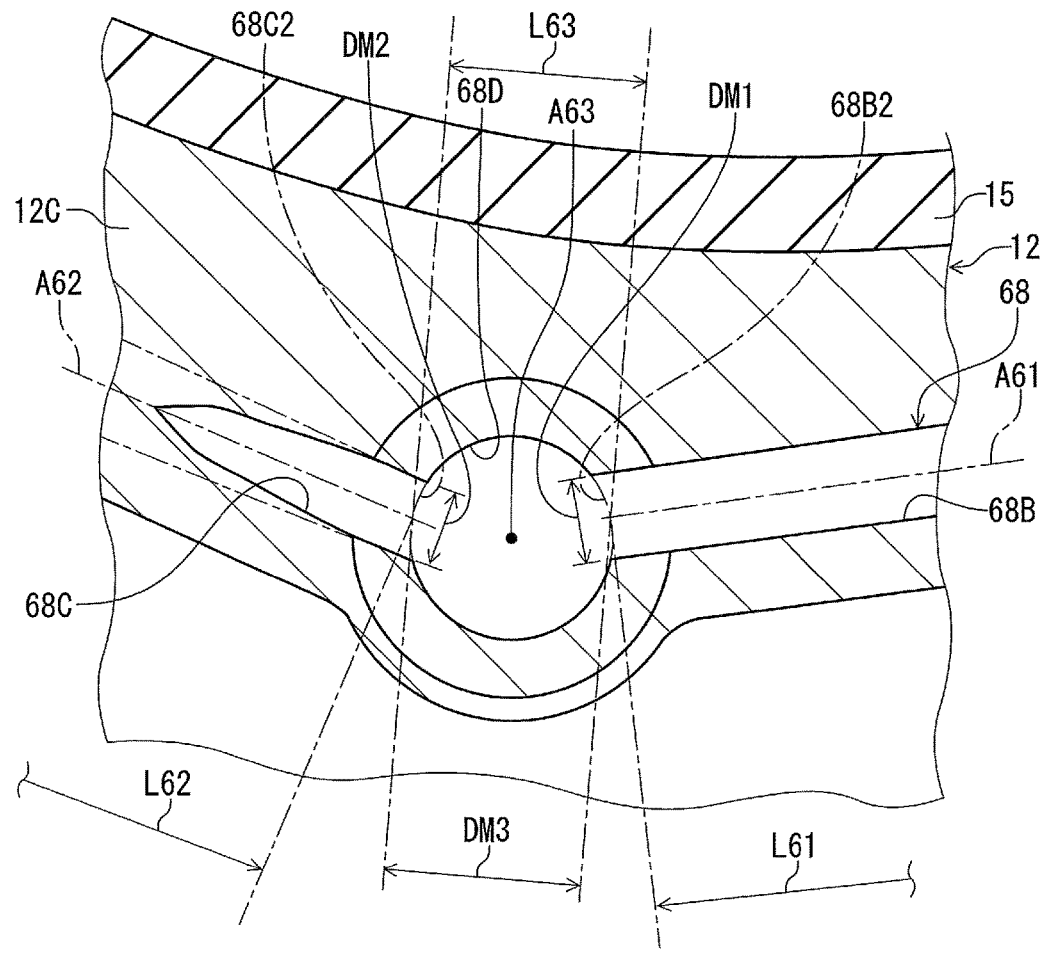
FIG. 14 is a partial enlarged cross-sectional view of the bicycle operating device illustrated in FIG. 12.
Figure 15:
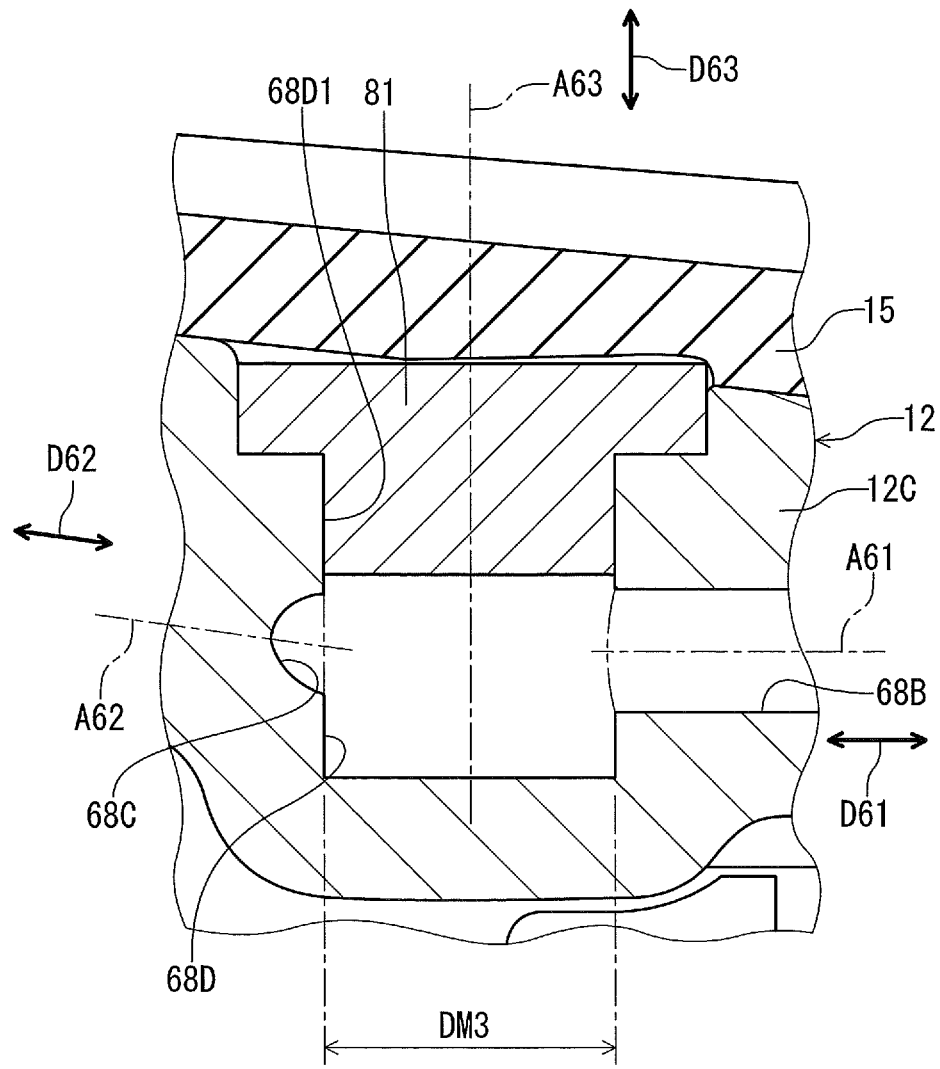
FIG. 15 is a partial enlarged cross-sectional view of the bicycle operating device illustrated in FIG. 10.

As seen in FIGS. 14 and 15, the fluid passageway 68 further includes a third part 68D connecting the first part 68B to the second part 68C. The third part 68D is provided between the first part 68B and the second part 68C. The third part 68D is provided in the grip portion 12C of the base member 12. As seen in FIG. 15, the third part 68D extends in a third direction D63 different from each of the first direction D61 and the second direction D62. The third part 68D has a third center axis A63 extending in the third direction D63. As seen in FIG. 15, an end of a hole 68D1 is closed with a plug 81. For example, the plug 81 is made of a resin material and is non-detachably joined to the base member 12 by melting their edges and pressing them together when they are hot. Thus, the plug 81 is not detachable from the base member 12 without damage in a usage state of the bicycle operating device 10.

As seen in FIG. 12, the first part 68B includes a first end 68B1 and a first additional end 68B2 opposite to the first end 68B1 along the first center axis A61. The first end 68B1 is closed with the plug 80. The first additional end 68B2 is connected to the third part 68D.

As seen in FIG. 13, the second part 68C includes a second end 68C1 and a second additional end 68C2 opposite to the second end 68C1 along the second center axis A62. The second end 68C1 is connected to the outlet port 70. The second additional end 68C2 is connected to the third part 68D. As seen in FIG. 14, the third part 68D has a third length L63 defined from the first additional end 68B2 to the second additional end 68C2.

Figure 16:
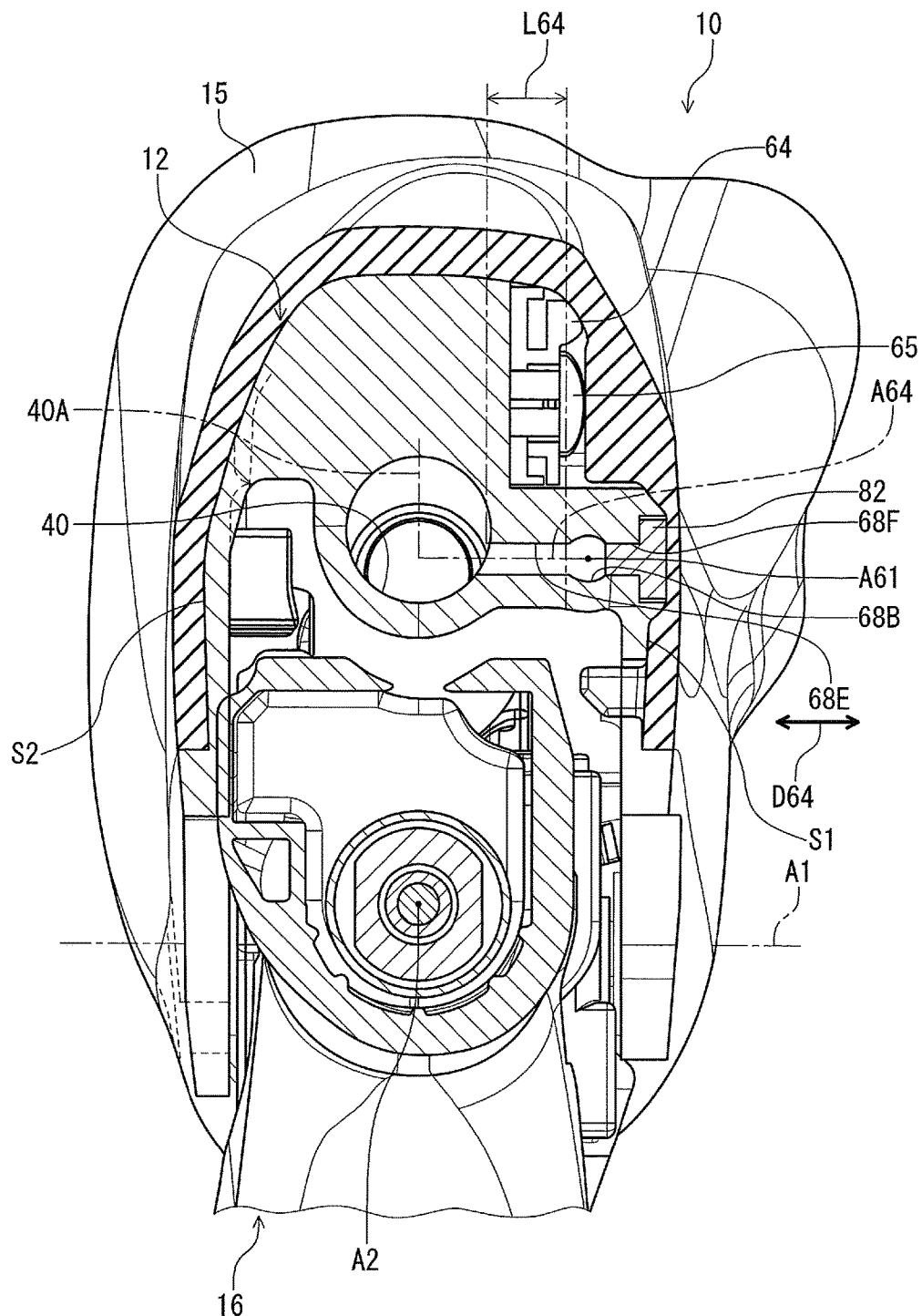
FIG. 16 is a cross-sectional view of the bicycle operating device taken along line XVI-XVI of FIG. 10.

As seen in FIGS. 10 and 16, the fluid passageway 68 further includes a fourth part 68E connecting the cylinder bore 40 to the first part 68B. The fourth part 68E perpendicularly extends from the cylinder bore 40. The first part 68B perpendicularly extends from the fourth part 68E. In this embodiment, the fourth part 68E extends in a fourth direction D64 different from each of the first direction D61, the second direction D62, and the third direction D63. The fourth part 68E has a fourth center axis A64 extending in the fourth direction D64. The cylinder bore 40 has a cylinder center axis 40A extending in the movement direction D4. The fourth part 68E extends from the cylinder bore 40 in fourth direction D64 defined perpendicularly to the cylinder center axis 40A. The fourth part 68E has a fourth length L64 defined along the fourth center axis A64. A hole 68F is provided on an opposite side of the fourth part 68E with respect to the first part 68B. The hole 68F is closed with a plug 82. For example, the plug 82 is made of a resin material and is non-detachably joined to the base member 12 by melting their edges and pressing them together when they are hot. Thus, the plug 82 is not detachable from the base member 12 without damage in a usage state of the bicycle operating device 10.

As seen in FIGS. 10 to 16, the fluid passageway 68 includes the fourth part 68E, the first part 68B, the third part 68D, and the second part 68C which are arranged from the cylinder bore 40 in this order. The length of the fluid passageway 68 is a total of the first length L61, the second length L62, the third length L63, and the fourth length L64.

As seen in FIGS. 10 and 12, the first part 68B extends so as to taper toward the second part 68C. The first part 68B has a tapered shape from the first end 68B1 to the first additional end 68B2. An inner diameter of the first part 68B gradually decreases from the first end 68B1 to the first additional end 68B2. A cross-sectional area of the first part 68B taken along the first center axis A61 gradually decreases from the first end 68B1 to the first additional end 68B2. The first part 68B has a first cross-sectional area taken along the first center axis A61.

In this embodiment, as seen in FIG. 14, the first part 68B has a first inner diameter DM1 defined at the first additional end 68B2. The first inner diameter DM1 is defined as a minimum inner diameter of the first part 68B in a case where the first part 68B has the tapered shape. The first cross-sectional area is defined as a minimum cross-sectional area of the first part 68B in a case where the first part 68B has the tapered shape.

As seen in FIGS. 11 and 13, the second part 68C extends so as to taper toward the first part 68B. The second part 68C has a tapered shape from the second end 68C1 to the second additional end 68C2. An inner diameter of the second part 68C gradually decreases from the second end 68C1 to the second additional end 68C2. A cross-sectional area of the second part 68C taken along the second center axis A62 gradually decreases from the second end 68C1 to the second additional end 68C2. The second part 68C has a second cross-sectional area taken along the second center axis A62.

In this embodiment, as seen in FIG. 14, the second part 68C has a second inner diameter DM2 defined at the second additional end 68C2. The second inner diameter DM2 is defined as a minimum inner diameter of the second part 68C in a case where the second part 68C has the tapered shape. The second cross-sectional area is defined as a minimum cross-sectional area of the second part 68C in a case where the second part 68C has the tapered shape. In this embodiment, the first inner diameter DM1 is equal to the second inner diameter DM2, and the first cross-sectional area is equal to the second cross-sectional area. However, the first inner diameter DM1 can be different from the second inner diameter DM2. The first cross-sectional area can be different from the second cross-sectional area.

As seen in FIG. 14, the third part 68D has a third inner diameter DM3 different from each of the first inner diameter DM1 and the second inner diameter DM2. The third inner diameter DM3 is larger than each of the first inner diameter DM1 and the second inner diameter DM2. The third part 68D has a third cross-sectional area taken along the third center axis A63. The third cross-sectional area is larger than each of the first cross-sectional area and the second cross-sectional area. However, the third inner diameter DM3 can be equal to or smaller than at least one of the first inner diameter DM1 and the second inner diameter DM2. The third cross-sectional area can be equal to or smaller than at least one of the first cross-sectional area and the second cross-sectional area.

Figure 17:
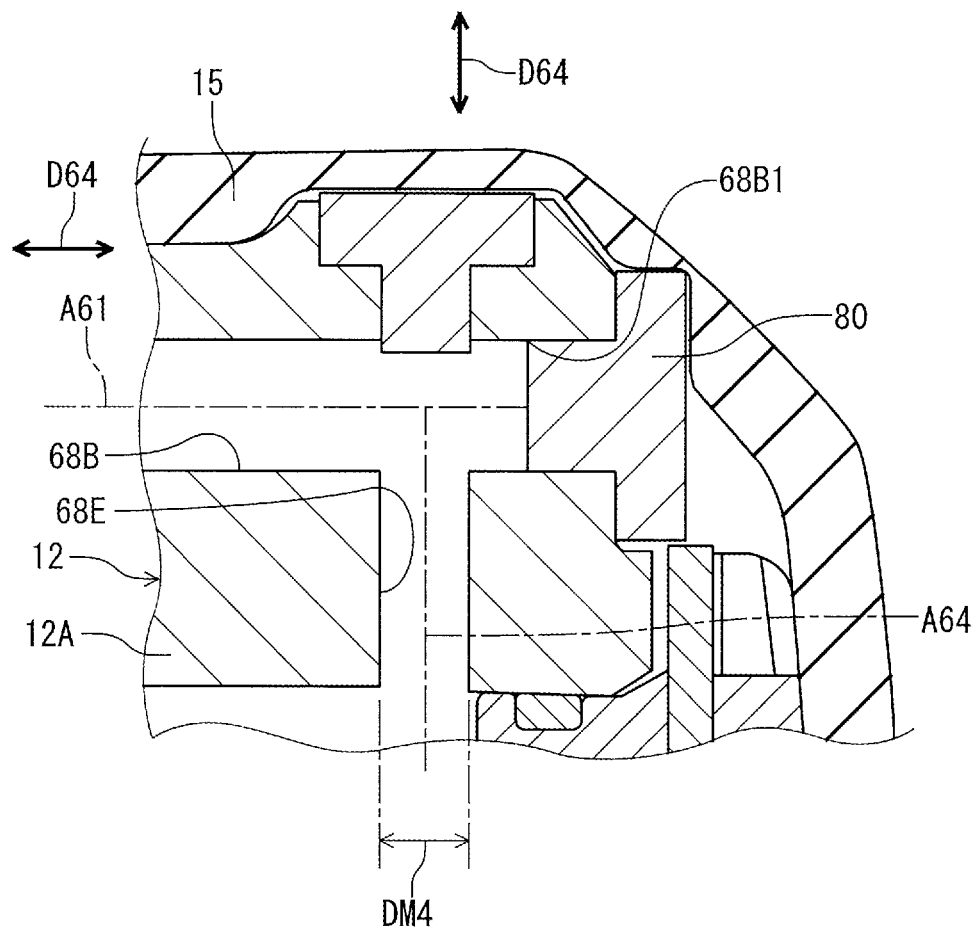
FIG. 17 is a partial enlarged cross-sectional view of the bicycle operating device illustrated in FIG. 10.

As seen in FIG. 17, the fourth part 68E has a fourth inner diameter DM4 different from each of the first inner diameter DM1 (FIG. 14), the second inner diameter DM2 (FIG. 14), and the third inner diameter DM3 (FIG. 14). The fourth inner diameter DM4 is smaller than each of the first inner diameter DM1, the second inner diameter DM2, and the third inner diameter DM3. The fourth part 68E has a fourth cross-sectional area taken along the fourth center axis A64. The fourth cross-sectional area is larger than each of the first cross-sectional area, the second cross-sectional area, and the third cross-sectional area. However, the fourth inner diameter DM4 can be equal to or smaller than at least one of the first inner diameter DM1, the second inner diameter DM2, and the third inner diameter DM3. The fourth cross-sectional area can be equal to or smaller than at least one of the first cross-sectional area, the second cross-sectional area, and the third cross-sectional area.

As seen in FIG. 8, the base member 12 includes an outer peripheral surface. The outer peripheral surface of the base member 12 includes a first side surface S1 and a second side surface S2. The second side surface S2 is laterally opposite to the first side surface S1 in the mounting state where the bicycle operating device 10 is mounted to the handlebar H. The cylinder bore 40 is provided between the first side surface S1 and the second side surface S2. The first part 68B is provided between the first side surface S1 and the cylinder bore 40.

Figure 18:
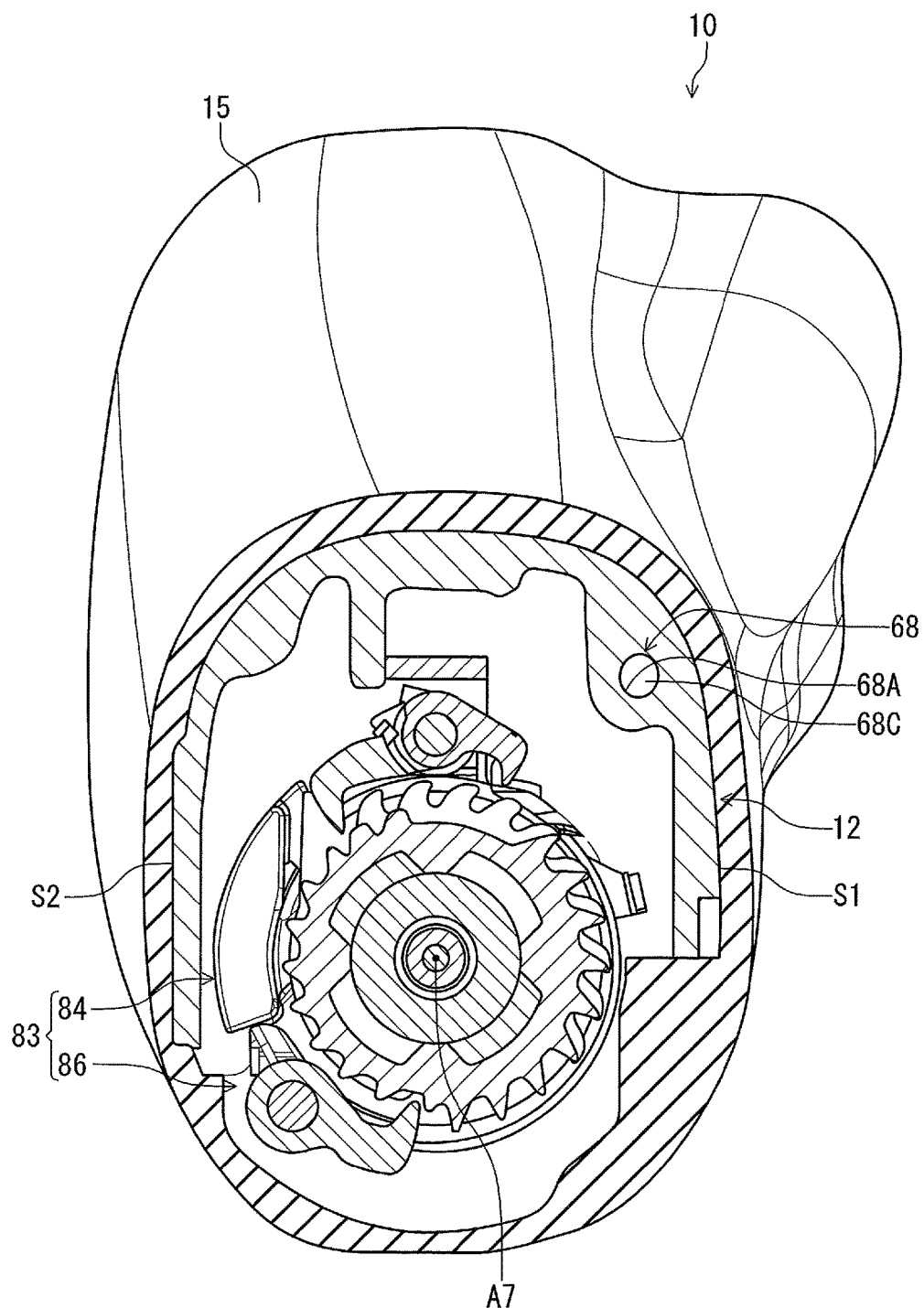
FIG. 18 is a cross-sectional view of the bicycle operating device taken along line XVIII-XVIII of FIG. 4.
Figure 19:
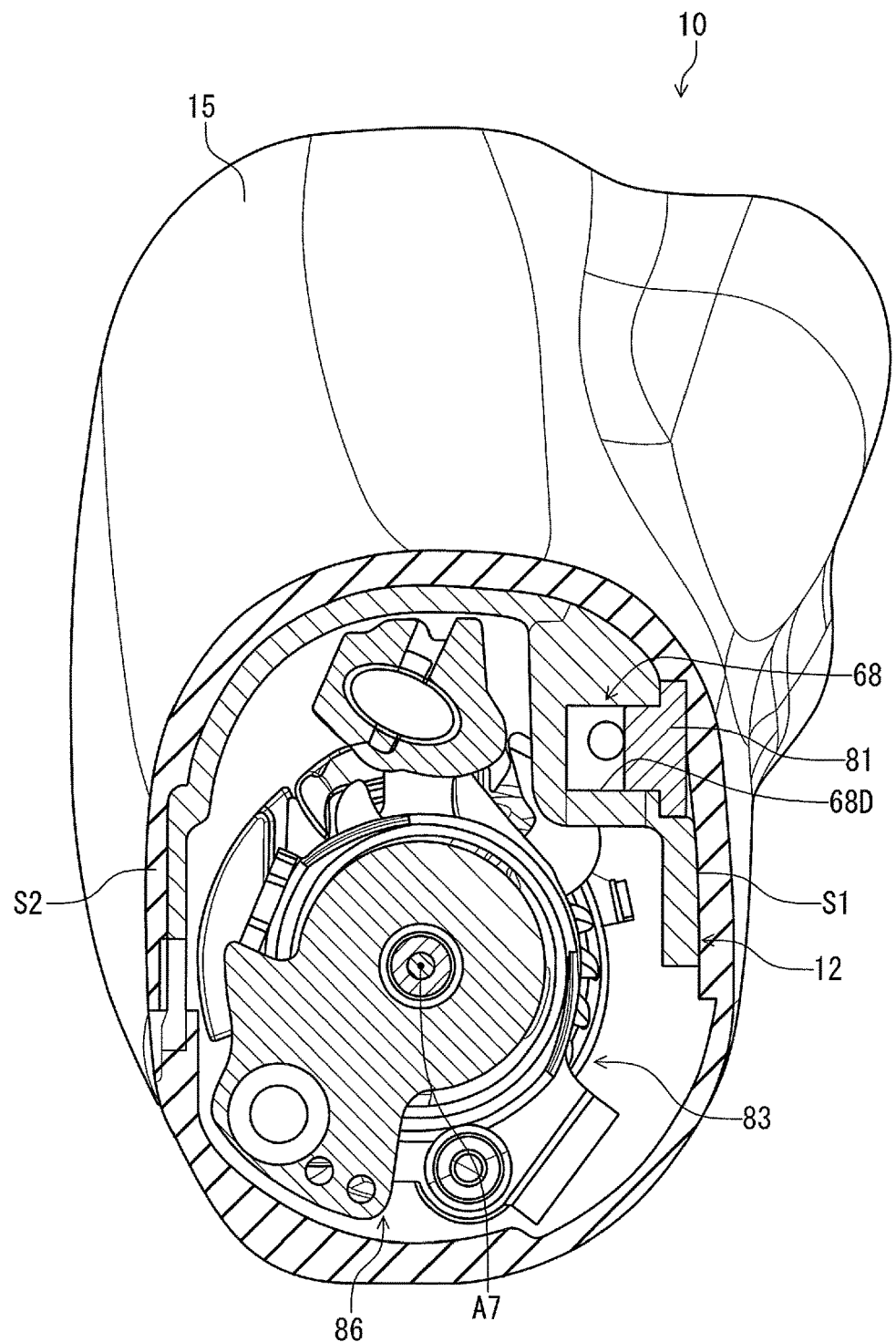
FIG. 19 is a cross-sectional view of the bicycle operating device taken along line XIX-XIX of FIG. 10.

As seen in FIGS. 10 and 16, the fluid passageway 68 is provided inside the base member 12 so as to at least partly extend between the outer peripheral surface and the cylinder bore 40. Specifically, the first part 68B extends between the first side surface S1 and the cylinder bore 40. As seen in FIG. 18, the second part 68C is provided between the first side surface S1 and the second side surface S2. As seen in FIG. 19, the third part 68D is provided between the first side surface S1 and the second side surface S2. As seen in FIGS. 18 and 19, the second part 68C and the third part 68D are closer to the first side surface S1 than the second side surface S2.

The base member 12 is made of a non-metallic material such as a resin material. In this embodiment, the base member 12 is made of a resin material. For example, the base member 12 is made of synthetic resin. The base member 12 is integrally formed by using integral molding. However, the base member 12 can be made of other materials such as a metallic material. For example, the base member 12 can be made of aluminum by using molding.

As seen in FIGS. 6 and 7, the bicycle operating device 10 further comprises a shifting unit 83 to operate a shifting device BC2. The shifting unit 83 includes a cable control member 84 pivotally provided on the base member 12 about a cable control axis A7. An inner wire of the mechanical control cable C2 is coupled to the cable control member 84. The cable control member 84 pivots relative to the base member 12 about the cable control axis A7 in response to the movement of the operating member 16 and the additional operating member 26.

The shifting unit 83 includes a cable operating structure 86 operatively coupling the operating member 16 and the additional operating member 26 to the cable control member 84. Specifically, the cable operating structure 86 pivots the cable control member 84 relative to the base member 12 in one of a pulling direction D81 and a releasing direction D82 in response to the movement of the operating member 16 (FIG. 3). Furthermore, the cable operating structure 86 pivots the cable control member 84 relative to the base member 12 in the other of the pulling direction D81 and the releasing direction D82 in response to the movement of the additional operating member 26 (FIG. 5). In this embodiment, the cable operating structure 86 pivots the cable control member 84 relative to the base member 12 in the releasing direction D82 in response to the movement of the operating member 16 (FIG. 3). Furthermore, the cable operating structure 86 pivots the cable control member 84 relative to the base member 12 in the pulling direction D81 in response to the movement of the additional operating member 26 (FIG. 5).

As seen in FIGS. 4 and 10, the cable control axis A7 and the cylinder center axis 40A are arranged to define a virtual plane together. The cable control axis A7, the cylinder center axis 40A, and the additional pivot axis A2 are arranged to define the virtual plane VP (FIG. 10) together. Structures of the shifting unit 83 have been known in the bicycle field, they will not be described in detail here for the sake of brevity. The shifting unit 83 can be omitted from the bicycle operating device 10.

The bicycle operating device 10 has the following features.

(1) The reservoir chamber 59 is provided above the cylinder bore 40 without overlapping with the cylinder bore 40 in the transverse direction D5 parallel to the pivot axis A1 in the mounting state. Accordingly, it is possible to efficiently arrange the hydraulic cylinder 36 and the hydraulic reservoir 58 in the bicycle operating device 10.

(2) The base member 12 includes the first end portion 12A, the second end portion 12B, and the grip portion 12C. The hydraulic reservoir 58 is provided at the first end portion 12A. Accordingly, it is possible to utilize the first end portion 12A of the base member 12 as an area in which the hydraulic reservoir 58 is provided. Accordingly, it is possible to more efficiently arrange the hydraulic cylinder 36 and the hydraulic reservoir 58 in the bicycle operating device 10.

(3) The first end portion 12A includes the pommel portion 12E. The hydraulic reservoir 58 is provided at the pommel portion 12E. Accordingly, it is possible to effectively utilize the pommel portion 12E as an area in which the hydraulic reservoir 58 is provided.

(4) The cylinder bore 40 is disposed between the first side surface S1 and the second side surface S2. The first part 68B is disposed between the first side surface S1 and the cylinder bore 40. Accordingly, it is possible to effectively utilize the base member 12 as an area in which the cylinder bore 40 and the fluid passageway 68 are provided. Accordingly, it is possible to more efficiently arrange the cylinder bore 40 and the fluid passageway 68 in the bicycle operating device 10.

(5) The operating member 16 extends downward from the base member 12 in the mounting state of the bicycle operating device 10. Accordingly, it is possible to improve operability of the operating device with efficiently arranging the hydraulic cylinder 36 and the reservoir chamber 59 in the bicycle operating device 10.

(6) The reservoir chamber 59 has the length L5 defined in the movement direction D4. The length of the reservoir chamber 59 is longer than the stroke ST of the piston 38. Accordingly, it is possible to maintain a desired size of the reservoir chamber 59.

(7) The cover member 15 is attached to the base member 12 to at least partly cover the base member 12. Accordingly, it is possible to at least partly protect the base member 12 with the cover member 15.

(8) The bicycle operating device 10 further comprises the shifting unit 83 to operate the shifting device BC2. Accordingly, it is possible to operate the shifting device in addition to a hydraulic bicycle component.

(9) The shifting unit 83 includes the cable control member 84 pivotally provided on the base member 12 about the cable control axis A7. Accordingly, it is possible to operate the shifting device via the cable control member 84.

(10) The cable control axis A7 and the cylinder center axis 40A are arranged to define the virtual plane together. Thus, it is possible to efficiently arrange the cylinder bore 40 and the shifting unit 83 in a direction perpendicular to the virtual plane. Accordingly, it is possible to make the bicycle operating device 10 compact in the direction perpendicular to the virtual plane.

(11) The bicycle operating device 10 further comprises the additional operating member 26 pivotally provided on one of the operating member 16 and the base member 12 about the additional pivot axis A2. The cable control axis A7, the cylinder center axis 40A, and the additional pivot axis A2 are arranged to define the virtual plane together. Thus, it is possible to efficiently arrange the cylinder bore 40, the shifting unit 83, and the additional operating member 26 in the direction perpendicular to the virtual plane. Accordingly, it is possible to make the bicycle operating device 10 more compact in the direction perpendicular to the virtual plane.

(12) Since the additional operating member 26 is provided on the operating member 16, it is possible to more efficiently arrange the operating member 16 and the additional operating member 26.

(13) The operating member 16 includes the base portion 18 and the operating portion 20. The base portion 18 is pivotally coupled to the base member 12 about the pivot axis A1. The operating portion 20 pivotally provided on the base portion 18 about the additional pivot axis A2. Accordingly, it is possible to operate two different bicycle components by using a pivotal movement of the operating occurring about the pivot axis A1 and another pivotal movement of the operating member 16 occurring about the additional pivot axis A2.

(14) The operating member 16 is pivotable relative to the base member 12 about the pivot axis A1 between the rest position P11 and the operated position P12. The piston 38 is configured to be pushed from the initial position P41 to the actuated position P42 in response to the movement of the operating member 16 from the rest position P11 toward the operated position P12 to supply the hydraulic pressure toward at least one bicycle component BC1. Accordingly, it is possible to operate the at least one bicycle component BC1 by using the operating member 16 and the hydraulic pressure.

It will be apparent to those skilled in the bicycle field from the present disclosure that the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member;
   an operating member pivotally coupled to the base member about a pivot axis; and
   a hydraulic unit provided on the base member and comprising:
      a hydraulic cylinder including a cylinder bore being at least partly provided above the pivot axis in a mounting state where the bicycle operating device is mounted to a bicycle;
      a piston movably provided in the cylinder bore, the cylinder bore and the piston defining a hydraulic chamber; and
      a hydraulic reservoir including a reservoir chamber connected to the hydraulic chamber, the reservoir chamber being provided to at least partially overlap from above the cylinder bore without overlapping with the cylinder bore in a transverse direction parallel to the pivot axis in the mounting state.

2. The bicycle operating device according to claim 1, wherein
   the base member includes
      a first end portion,
      a second end portion opposite to the first end portion and configured to be mounted to a handlebar of the bicycle, and
      a grip portion provided between the first end portion and the second end portion, and
   the hydraulic reservoir is provided at the first end portion.

3. The bicycle operating device according to claim 2, wherein
   the first end portion includes a pommel portion, and
   the hydraulic reservoir is provided at the pommel portion.

4. The bicycle operating device according to claim 1, wherein
   the base member includes
      a first side surface,
      a second side surface laterally opposite to the first side surface in the mounting state of the bicycle operating device, and
      a fluid passageway connected to the hydraulic chamber,
   the cylinder bore is disposed between the first side surface and the second side surface, and
   the fluid passageway is disposed between the first side surface and the cylinder bore.

5. The bicycle operating device according to claim 1, wherein
   the operating member extends downward from the base member in the mounting state of the bicycle operating device.

6. The bicycle operating device according to claim 1, wherein
   the piston is movable relative to the hydraulic cylinder in a movement direction,
   the reservoir chamber has a length defined in the movement direction, and
   the length of the reservoir chamber is longer than a stroke of the piston.

7. The bicycle operating device according to claim 1, further comprising:
   a cover member attached to the base member to at least partly cover the base member, the cover member being at least partly made of an elastic material.

8. The bicycle operating device according to claim 1, further comprising:
   a shifting unit to operate a shifting device.

9. The bicycle operating device according to claim 8, wherein
   the shifting unit includes a cable control member pivotally provided on the base member about a cable control axis.

10. The bicycle operating device according to claim 9, wherein
    the piston is movable relative to the hydraulic cylinder in a movement direction,
    the cylinder bore has a cylinder center axis extending in the movement direction, and
    the cable control axis and the cylinder center axis are arranged to define a virtual plane together.

11. The bicycle operating device according to claim 10, further comprising:
    an additional operating member pivotally provided on one of the operating member and the base member about an additional pivot axis, wherein
    the cable control axis, the cylinder center axis, and the additional pivot axis are arranged to define the virtual plane together.

12. The bicycle operating device according to claim 11, wherein
    the additional operating member is provided on the operating member.

13. The bicycle operating device according to claim 12, wherein
    the operating member includes
       a base portion pivotally coupled to the base member about the pivot axis, and
       an operating portion pivotally provided on the base portion about the additional pivot axis.

14. A bicycle operating device comprising:
    a base member;
    an operating member pivotally coupled to the base member about a pivot axis; and
    a hydraulic unit provided on the base member and comprising:
       a hydraulic cylinder including a cylinder bore being at least partly provided above the pivot axis in a mounting state where the bicycle operating device is mounted to a bicycle;
       a piston movably provided in the cylinder bore, the cylinder bore and the piston defining a hydraulic chamber; and
       a hydraulic reservoir including a reservoir chamber connected to the hydraulic chamber, the reservoir chamber being provided above the cylinder bore without overlapping with the cylinder bore in a transverse direction parallel to the pivot axis in the mounting state, wherein the operating member is pivotable relative to the base member about the pivot axis between a rest position and an operated position, and the piston is configured to be pushed from an initial position to an actuated position in response to a movement of the operating member from the rest position toward the operated position to supply a hydraulic pressure toward at least one bicycle component.

15. A bicycle operating device comprising:

a base member;

an operating member pivotally coupled to the base member about a pivot axis; and a hydraulic unit provided on the base member and comprising:

a hydraulic cylinder including a cylinder bore being at least partly provided above the pivot axis in a mounting state where the bicycle operating device is mounted to a bicycle;

a piston movably provided in the cylinder bore, the cylinder bore and the piston defining a hydraulic chamber; and a hydraulic reservoir including a reservoir chamber connected to the hydraulic chamber, the reservoir chamber being provided above the cylinder bore without overlapping with the cylinder bore in a transverse direction parallel to the pivot axis in the mounting state, wherein the piston is movable relative to the hydraulic cylinder in a movement direction, the cylinder bore has a cylinder center axis extending in the movement direction, and the cylinder bore is arranged without overlapping with the pivot axis as viewed in a direction perpendicular to the cylinder center axis.

* * * * *